(12) United States Patent
Folgner et al.

(10) Patent No.: US 9,141,271 B2
(45) Date of Patent: Sep. 22, 2015

(54) TAKING ACTION UPON USERS IN A SOCIAL NETWORKING SYSTEM WITH RESPECT TO A PURPOSE BASED ON COMPATIBILITY OF THE USERS TO THE PURPOSE

(75) Inventors: Mike Folgner, San Francisco, CA (US); Ryan Cunningham, San Francisco, CA (US); Chris Kalaboukis, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 1212 days.

(21) Appl. No.: 12/548,140

(22) Filed: Aug. 26, 2009

(65) Prior Publication Data

US 2011/0055725 A1 Mar. 3, 2011

(51) Int. Cl.
*G06F 3/00* (2006.01)
*G06F 3/0486* (2013.01)
*H04L 12/58* (2006.01)

(52) U.S. Cl.
CPC ............ *G06F 3/0486* (2013.01); *H04L 12/588* (2013.01); *H04L 51/32* (2013.01)

(58) Field of Classification Search
USPC ................................................. 715/751, 758
See application file for complete search history.

(56) References Cited

U.S. PATENT DOCUMENTS

| 6,128,599 | A | 10/2000 | Walker et al. | |
|---|---|---|---|---|
| 7,761,399 | B2 * | 7/2010 | Evans | 706/55 |
| 8,805,996 | B1 * | 8/2014 | Gauvin | 709/224 |
| 2006/0242581 | A1 * | 10/2006 | Manion et al. | 715/733 |
| 2008/0134053 | A1 * | 6/2008 | Fischer | 715/747 |
| 2008/0172464 | A1 * | 7/2008 | Thattai et al. | 709/205 |
| 2008/0209320 | A1 * | 8/2008 | Mawhinney et al. | 715/700 |
| 2008/0215425 | A1 | 9/2008 | Guldimann et al. | |
| 2008/0215426 | A1 | 9/2008 | Guldimann et al. | |
| 2008/0243780 | A1 * | 10/2008 | Nance et al. | 707/3 |
| 2008/0250450 | A1 * | 10/2008 | Larner et al. | 725/34 |
| 2008/0294624 | A1 * | 11/2008 | Kanigsberg et al. | 707/5 |
| 2009/0109037 | A1 * | 4/2009 | Farmer | 340/576 |
| 2009/0164454 | A1 * | 6/2009 | Sanguinetti et al. | 707/5 |
| 2009/0164897 | A1 * | 6/2009 | Amer-Yahia et al. | 715/703 |
| 2009/0192865 | A1 | 7/2009 | Soza et al. | |
| 2009/0281988 | A1 * | 11/2009 | Yoo | 707/3 |
| 2009/0313550 | A1 * | 12/2009 | Kim et al. | 715/744 |
| 2010/0017371 | A1 * | 1/2010 | Whalin et al. | 707/3 |
| 2010/0095225 | A1 * | 4/2010 | Langlois et al. | 715/757 |
| 2010/0144426 | A1 * | 6/2010 | Winner et al. | 463/25 |
| 2010/0235788 | A1 * | 9/2010 | Zappa et al. | 715/811 |
| 2010/0262469 | A1 * | 10/2010 | Fein et al. | 705/10 |
| 2010/0292917 | A1 * | 11/2010 | Emam et al. | 701/201 |
| 2011/0004501 | A1 * | 1/2011 | Pradhan et al. | 705/8 |
| 2011/0029894 | A1 * | 2/2011 | Eckstein | 715/753 |

(Continued)

*Primary Examiner* — Ryan Pitaro
(74) *Attorney, Agent, or Firm* — James J. DeCarlo; Greenberg Traurig, LLP

(57) ABSTRACT

Techniques are described herein that are capable of taking action upon users in a social networking system with respect to a purpose based on compatibility of the users to the purpose. The action may be further based on compatibility of the users and the purpose to a venue. Example actions include but are not limited to recommending users for a purpose and/or a venue; recommending a purpose for users and/or a venue; recommending a venue for users and/or a purpose; inviting users to join a group, to attend an event, or to perform an action; etc. For instance, the social networking system may include a network manager that performs a compatibility analysis with respect to attributes of users, a purpose, and/or a venue, respectively. The network manager may take an action upon the users (or a subset thereof) based on the results of the compatibility analysis.

20 Claims, 21 Drawing Sheets

(56) References Cited

U.S. PATENT DOCUMENTS

| | | | |
|---|---|---|---|
| 2011/0040753 A1* | 2/2011 | Knight | 707/733 |
| 2011/0047012 A1* | 2/2011 | Sherman | 705/14.1 |
| 2011/0185020 A1* | 7/2011 | Ramamurthy et al. | 709/204 |
| 2011/0201317 A1* | 8/2011 | Karandikar et al. | 455/414.1 |
| 2011/0219073 A1* | 9/2011 | Lawler et al. | 709/204 |
| 2011/0320250 A1 | 12/2011 | Gemmell et al. | |
| 2012/0109751 A1 | 5/2012 | Binenstock et al. | |
| 2012/0150619 A1 | 6/2012 | Jacob Sushil et al. | |

* cited by examiner

US 9,141,271 B2

TAKING ACTION UPON USERS IN A SOCIAL NETWORKING SYSTEM WITH RESPECT TO A PURPOSE BASED ON COMPATIBILITY OF THE USERS TO THE PURPOSE

BACKGROUND OF THE INVENTION

1. Field of the Invention

The present invention generally relates to social networking. In particular, the present invention is related to taking action upon users in a social networking system with respect to a purpose based on compatibility of the users to the purpose.

2. Background

Social networking systems, including social networks, such as Facebook®, MySpace®, Twitter®, and LinkedIn®, enable a user to interact with other users who are members of an affinity set of the user. Such other users are often referred to as "connections" of the user. For example, an affinity set may be any group of persons, including a group of friends, business associates, players of a massively multiplayer online game, persons with a common interest, all users of a social network, application ("app"), or web site, or a subgroup thereof. A user may belong to any number of affinity sets.

For instance, a user may broadcast social networking updates (e.g., messages regarding the user, the user's observations, etc.) to the user's connections, and the user may receive social networking updates from those connections. The social networking updates may be provided via email, short message service (SMS), instant message (IM), or any other suitable messaging technology.

It may be desirable for a user to invite one or more of the user's connections to join a group, to attend an event, to perform a task, etc. However, the user may not know whether interests, preferences, and/or requirements of the respective connections are compatible with one another. Moreover, the interests, preferences, and/or requirements of the respective connections may not align with a purpose of the group, event, task, etc. that is the subject of the invitation.

Thus, systems, methods, and computer program products are needed that are capable of taking action upon users in a social networking system with respect to a purpose based on compatibility of the users with the purpose.

BRIEF SUMMARY OF THE INVENTION

Various approaches are described herein for, among other things, taking action upon users in a social networking system with respect to a purpose based on compatibility of the users to the purpose. The action may be further based on compatibility of the users and the purpose with a venue. Example actions include but are not limited to recommending users for a purpose and/or a venue; recommending a purpose for users and/or a venue; recommending a venue for users and/or a purpose; inviting users to join a group, to attend an event, or to perform an action; etc.

User attributes may be associated with respective users, purpose attributes may be associated with a purpose, and venue attributes may be associated with a venue (if applicable). For example, the social networking system may include a network manager that is configured to perform a compatibility analysis with respect to the attributes of the users, the purpose, and/or the venue. In accordance with this example, the network manager may be further configured to take an action upon the users (or a subset thereof) based on the results of the compatibility analysis.

In a first example implementation of the network manager, user attributes associated with respective users and purpose attributes associated with a purpose are used to determine a venue having venue attributes that are compatible with the user attributes and the purpose attributes. For instance, the venue may be recommended for the users to achieve the purpose.

In a second example implementation of the network manager, user attributes associated with respective users and venue attributes associated with a venue are used to determine a purpose having purpose attributes that are compatible with the user attributes and the venue attributes. For example, the purpose may be recommended to be achieved by the users at the venue.

In a third example implementation of the network manager, purpose attributes associated with a purpose and venue attributes associated with a venue are used to determine users having respective user attributes that are compatible with the purpose attributes and the venue attributes. For example, the users may be recommended for achieving the purpose at the venue.

In a fourth example implementation of the network manager, user attributes associated with respective users are used to determine a purpose having purpose attributes and a venue having venue attributes, such that the user attributes, the purpose attributes, and the venue attributes are compatible. For instance, the purpose and the venue may be recommended, so that the users may attempt to achieve the purpose at the venue.

In a fifth example implementation of the network manager, purpose attributes associated with a purpose are used to determine users having user attributes and a venue having venue attributes, such that the purpose attributes, the user attributes, and the venue attributes are compatible. For instance, the users and the venue may be recommended, so that the users may attempt to achieve the purpose at the venue.

In a sixth example implementation of the network manager, venue attributes associated with a venue are used to determine a purpose having purpose attributes and users having respective user attributes, such that the venue attributes, the purpose attributes, and the user attributes are compatible. For example, the purpose and the users may be recommended, so that the users may attempt to achieve the purpose at the venue. In accordance with the first through sixth example implementation of the network manager, an invitation may be provided to the users to achieve the purpose at the venue.

In a seventh example implementation of the network manager, user attributes associated with respective users are used to determine a purpose having purpose attributes that are compatible with the user attributes. For example, the purpose may be recommended to be achieved by the users.

In an eighth example implementation of the network manager, purpose attributes associated with a purpose are used to determine users having respective user attributes that are compatible with the purpose attributes. For instance, the users may be recommended for achieving the purpose. In accordance with the seventh and eighth example implementation of the network manager, an invitation may be provided to the users to achieve the purpose.

A method is described for taking action upon users in a social networking system with respect to a purpose based on compatibility of the users to the purpose. In accordance with this method, first attributes associated with respective users in a social networking system are compared to second attribute(s) associated with a purpose. Action is taken upon at least one of the users with respect to the purpose. The user(s)

upon whom the action is taken have respective attributes of the first attributes that are compatible with the second attribute(s).

Another method is described for taking action upon users in a social networking system with respect to a purpose based on compatibility of the users to the purpose. In accordance with this method, a graphical user interface is provided that includes an interface element and identifiers. The interface element represents a group that corresponds to a purpose. The purpose is associated with first attribute(s). The identifiers represent the respective users. The users have respective second attributes that are compatible with the first attribute(s). The interface element includes at least one of the identifiers that represents a respective at least one of the users having a respective at least one of the second attributes. Venue(s) associated with respective third attribute(s) are recommended that are compatible with the first attribute(s) and the at least one of the second attributes.

Yet another method is described for taking action upon users in a social networking system with respect to a purpose based on compatibility of the users to the purpose. In accordance with this method, a graphical user interface is provided that includes an interface element and identifiers. The interface element represents a group that corresponds to a purpose. The purpose is associated with first attribute(s). The identifiers represent the respective users. The users have respective second attributes. At least one of the identifiers is recommended for inclusion in the interface element. The at least one identifier represents at least one respective user that has at least one respective second attribute that is compatible with the first attribute(s).

A system is described, which includes a comparison module and an action module. The comparison module is configured to compare first attributes associated with respective users in a social networking system to second attribute(s) associated with a purpose. The action module is configured to take action upon at least one of the users with respect to the purpose. The user(s) upon whom the action is taken have respective attributes of the first attributes that are compatible with the second attribute(s).

Another system is described, which includes a graphical user interface (GUI) module, an identifier module, and a venue recommendation module. The GUI module is configured to provide a graphical user interface that includes an interface element. The interface element represents a group that corresponds to a purpose. The purpose is associated with first attribute(s). The identifier module is configured to provide identifiers that represent the respective users. The users have respective second attributes that are compatible with the first attribute(s). The interface element includes at least one of the identifiers that represents a respective at least one of the users having a respective at least one of the second attributes. The venue recommendation module recommends venue(s) associated with respective third attribute(s) that are compatible with the first attribute(s) and the at least one of the second attributes.

Yet another system is described, which includes a graphical user interface (GUI) module, an identifier module, and an identifier recommendation module. The GUI module is configured to provide a graphical user interface that includes an interface element. The interface element represents a group that corresponds to a purpose. The purpose is associated with first attribute(s). The identifier module is configured to provide identifiers that represent the respective users. The users have respective second attributes. The identifier module is configured to recommend at least one of the identifiers for inclusion in the interface element. The at least one identifier represents at least one respective user that has at least one respective second attribute that is compatible with the first attribute(s).

A computer program product is described, which includes a computer-readable medium having computer program logic recorded thereon for taking action upon users in a social networking system with respect to a purpose based on compatibility of the users to the purpose. The computer program logic includes a first program logic module and a second program logic module. The first program logic module is for enabling the processor-based system to compare first attributes associated with respective users in a social networking system to second attribute(s) associated with a purpose. The second program logic module is for enabling the processor-based system to take action upon at least one of the users with respect to the purpose. The user(s) upon whom the action is taken have respective attributes of the first attributes that are compatible with the second attribute(s).

Another computer program product is described, which includes a computer-readable medium having computer program logic recorded thereon for taking action upon users in a social networking system with respect to a purpose based on compatibility of the users to the purpose. The computer program logic includes a first program logic module and a second program logic module. The first program logic module is for enabling the processor-based system to provide a graphical user interface that includes an interface element and identifiers. The interface element represents a group that corresponds to a purpose. The purpose is associated with first attribute(s). The identifiers represent the respective users. The users have respective second attributes that are compatible with the first attribute(s). The interface element includes at least one of the identifiers that represents a respective at least one of the users having a respective at least one of the second attributes. The second program logic module is for enabling the processor-based system to recommend venue(s) associated with respective third attribute(s) that are compatible with the first attribute(s) and the at least one of the second attributes.

Yet another computer program product is described, which includes a computer-readable medium having computer program logic recorded thereon for taking action upon users in a social networking system with respect to a purpose based on compatibility of the users to the purpose. The computer program logic includes a first program logic module and a second program logic module. The first program logic module is for enabling the processor-based system to provide a graphical user interface that includes an interface element and identifiers. The interface element represents a group that corresponds to a purpose. The purpose is associated with first attribute(s). The identifiers represent the respective users. The users have respective second attributes. The second program logic module is for enabling the processor-based system to recommend at least one of the identifiers for inclusion in the interface element. The at least one identifier represents at least one respective user that has at least one respective second attribute that is compatible with the first attribute(s).

Further features and advantages of the disclosed technologies, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
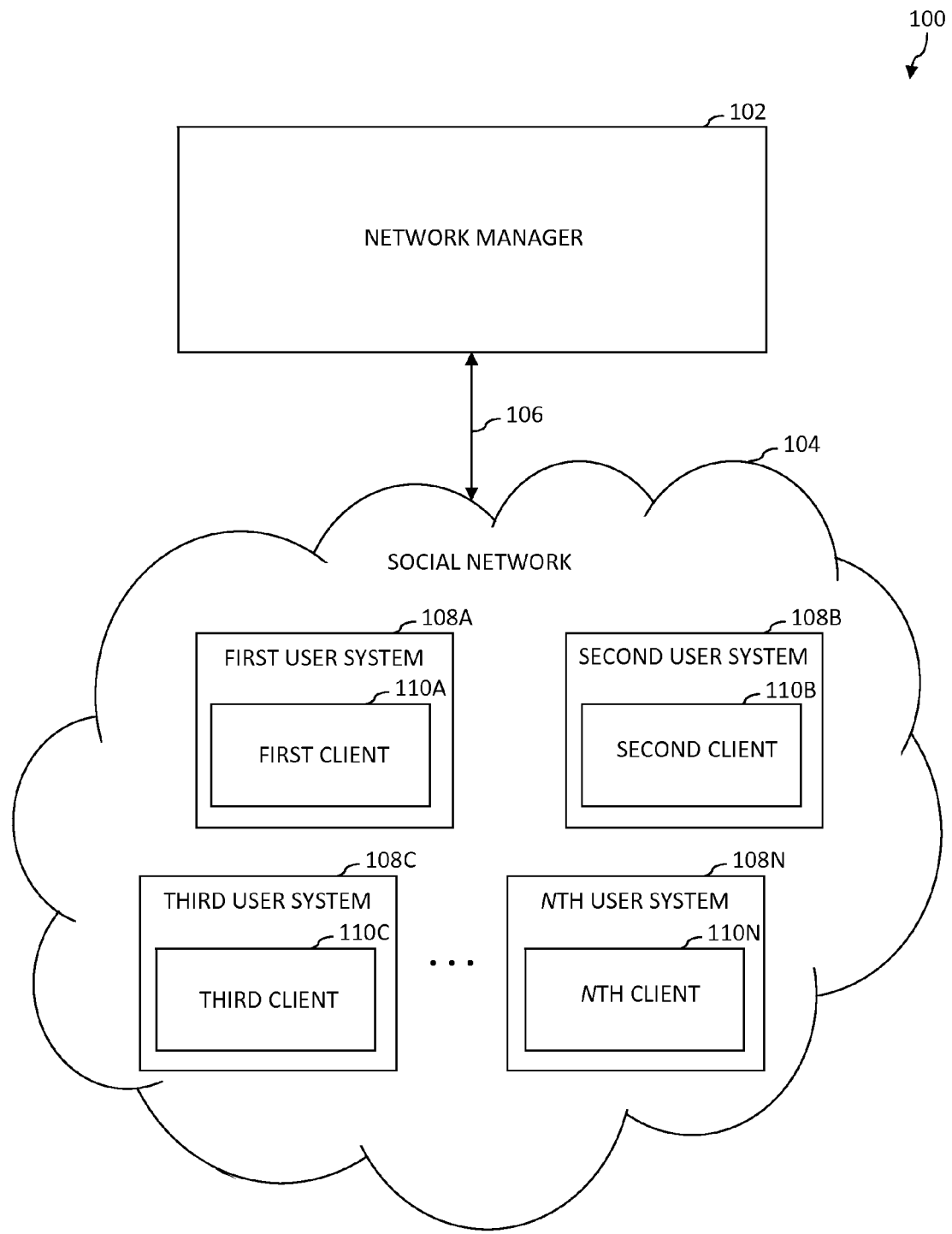
FIG. 1 is a block diagram of an example social networking system in accordance with an embodiment described herein.

FIGS. 5, 7, 9, 11, and 16 are block diagrams of example implementations of a network manager shown in FIG. 1 in accordance with embodiments described herein.

Figure 6A:
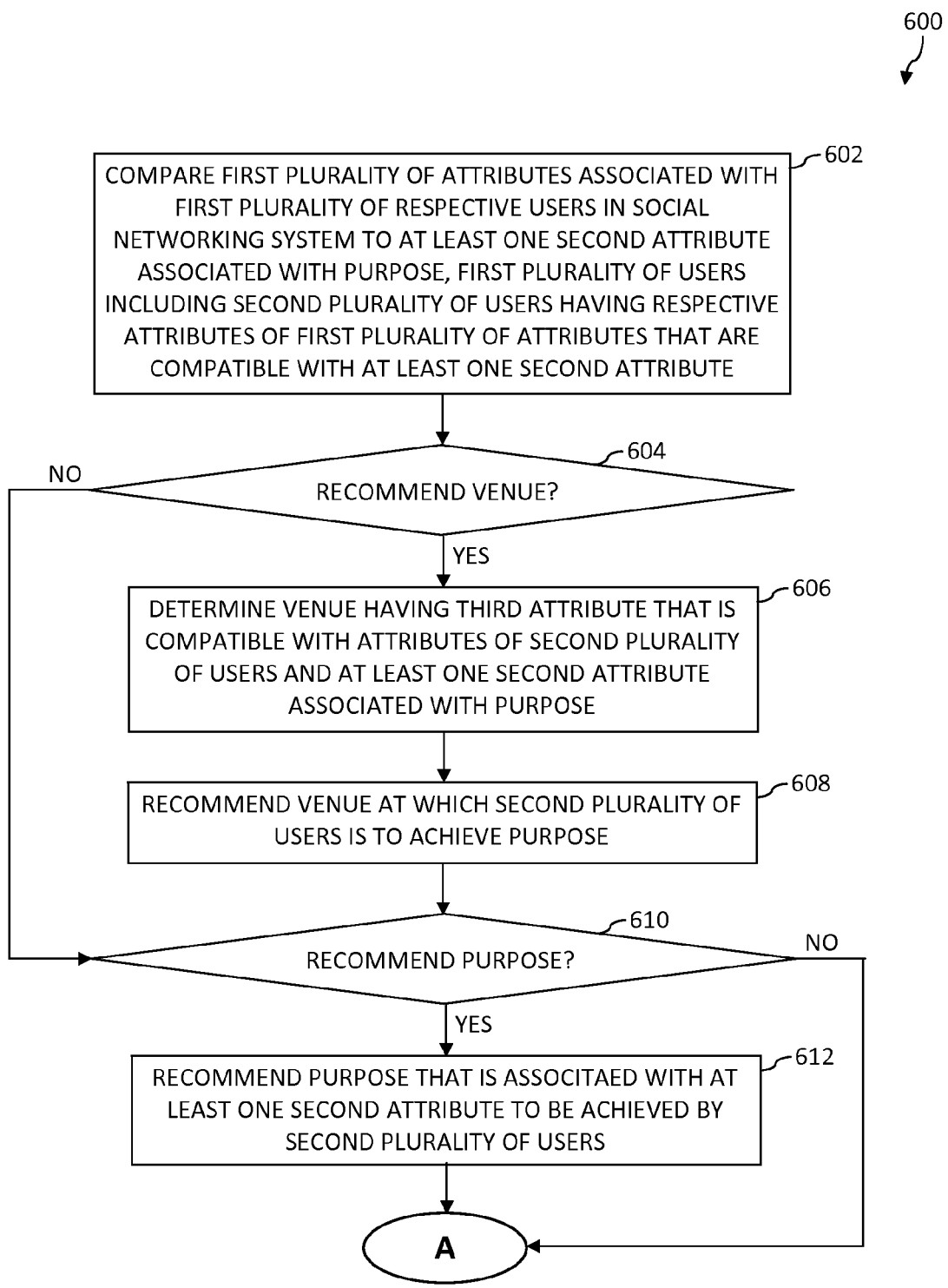
Figure 6B:
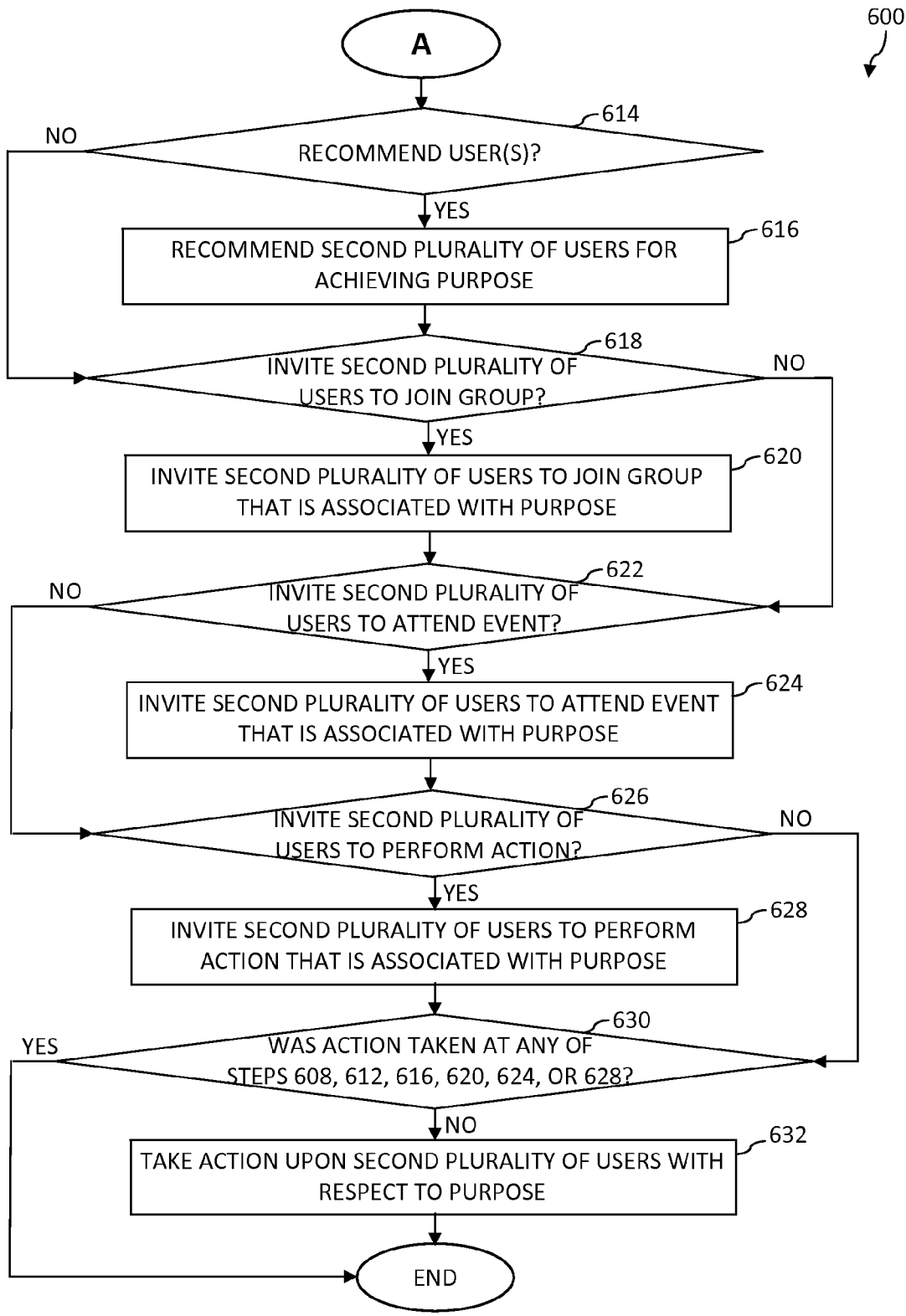

FIGS. 6A-6B depict respective portions of a flowchart of another method for taking action upon users in a social networking system with respect to a purpose based on compatibility of the users to the purpose in accordance with an embodiment described herein.

Figure 8:
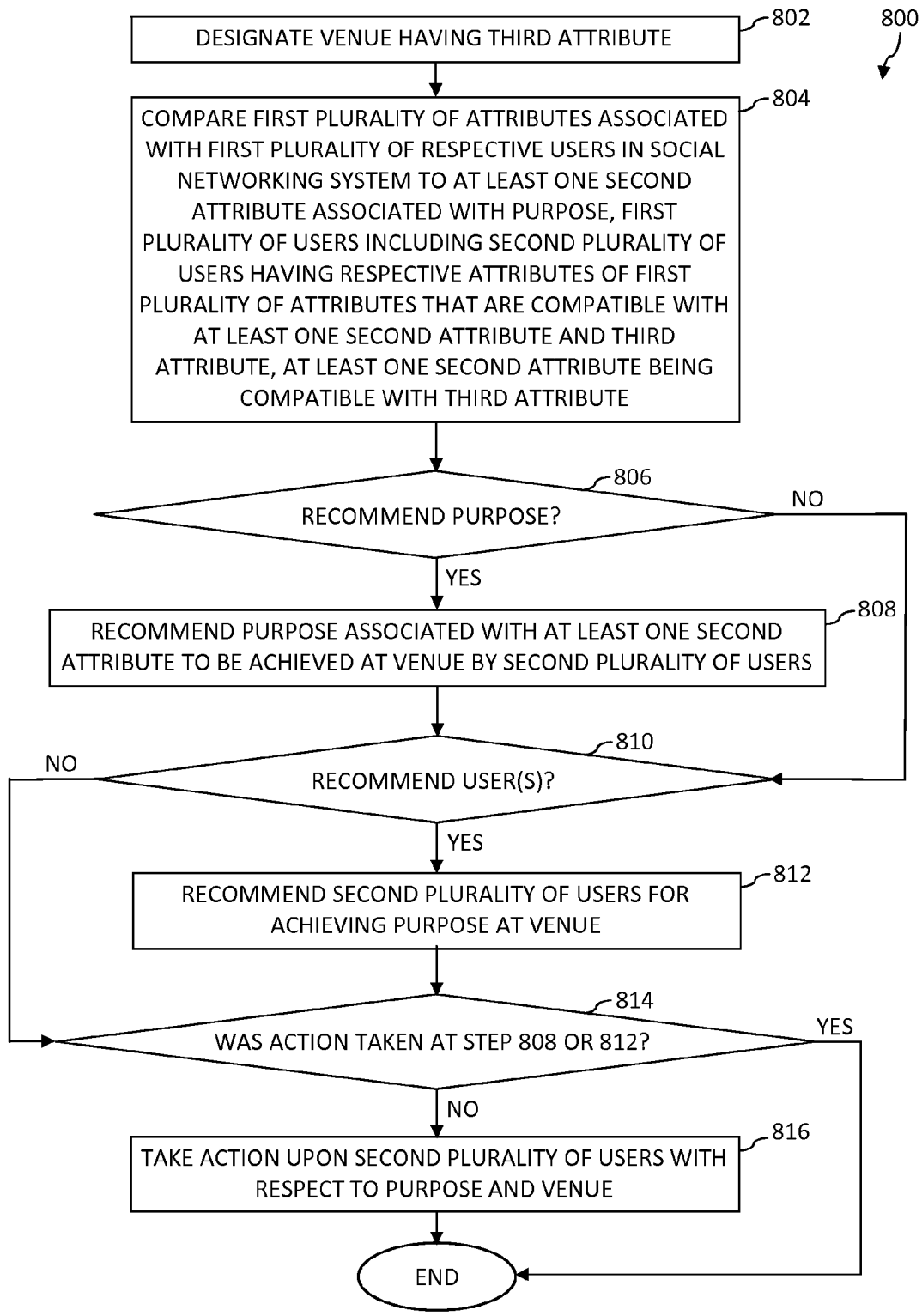

FIG. 8 depicts a flowchart of a yet another method for taking action upon users in a social networking system with respect to a purpose based on compatibility of the users to the purpose in accordance with an embodiment described herein.

Figure 10A:
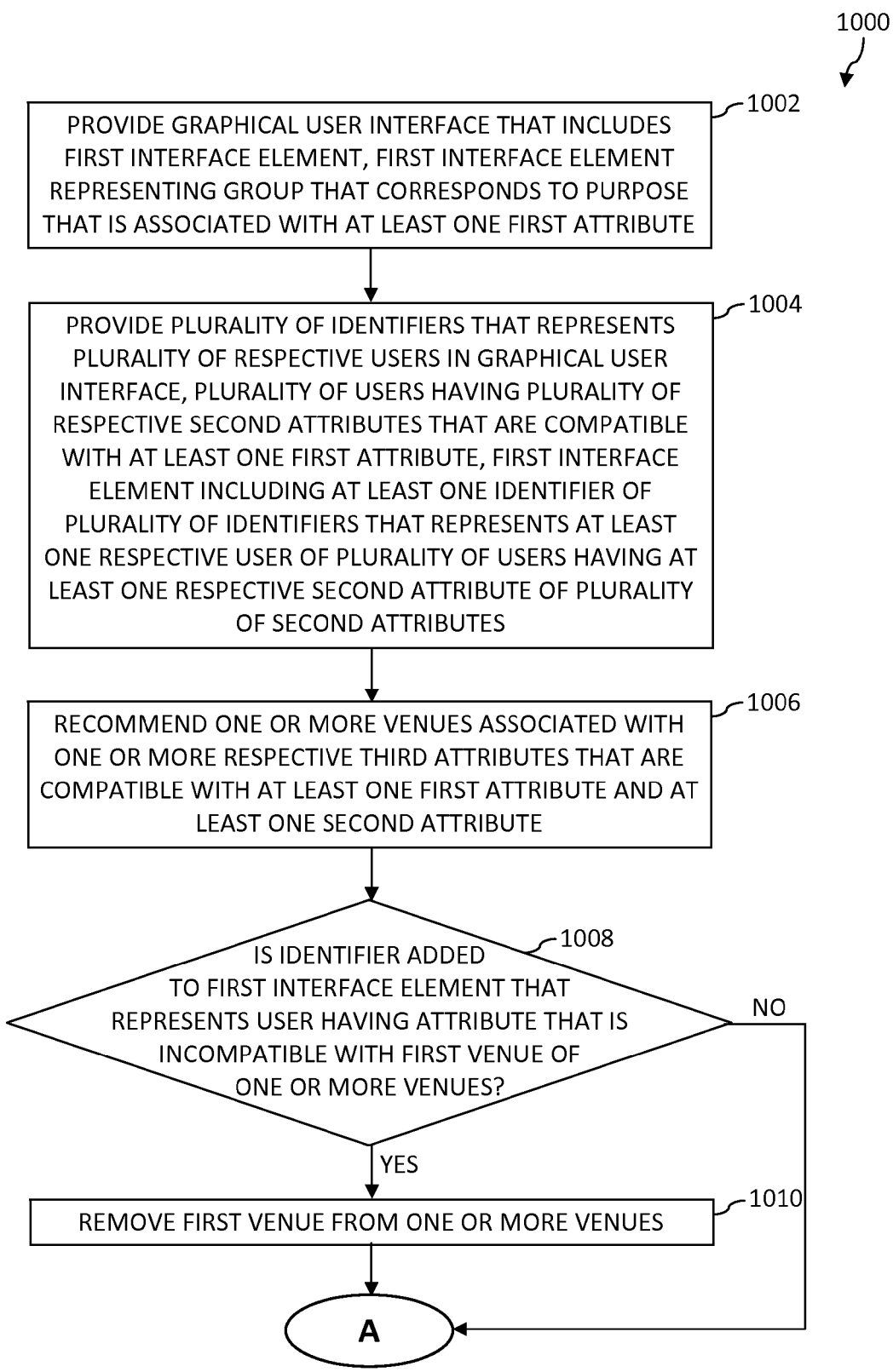
Figure 10B:
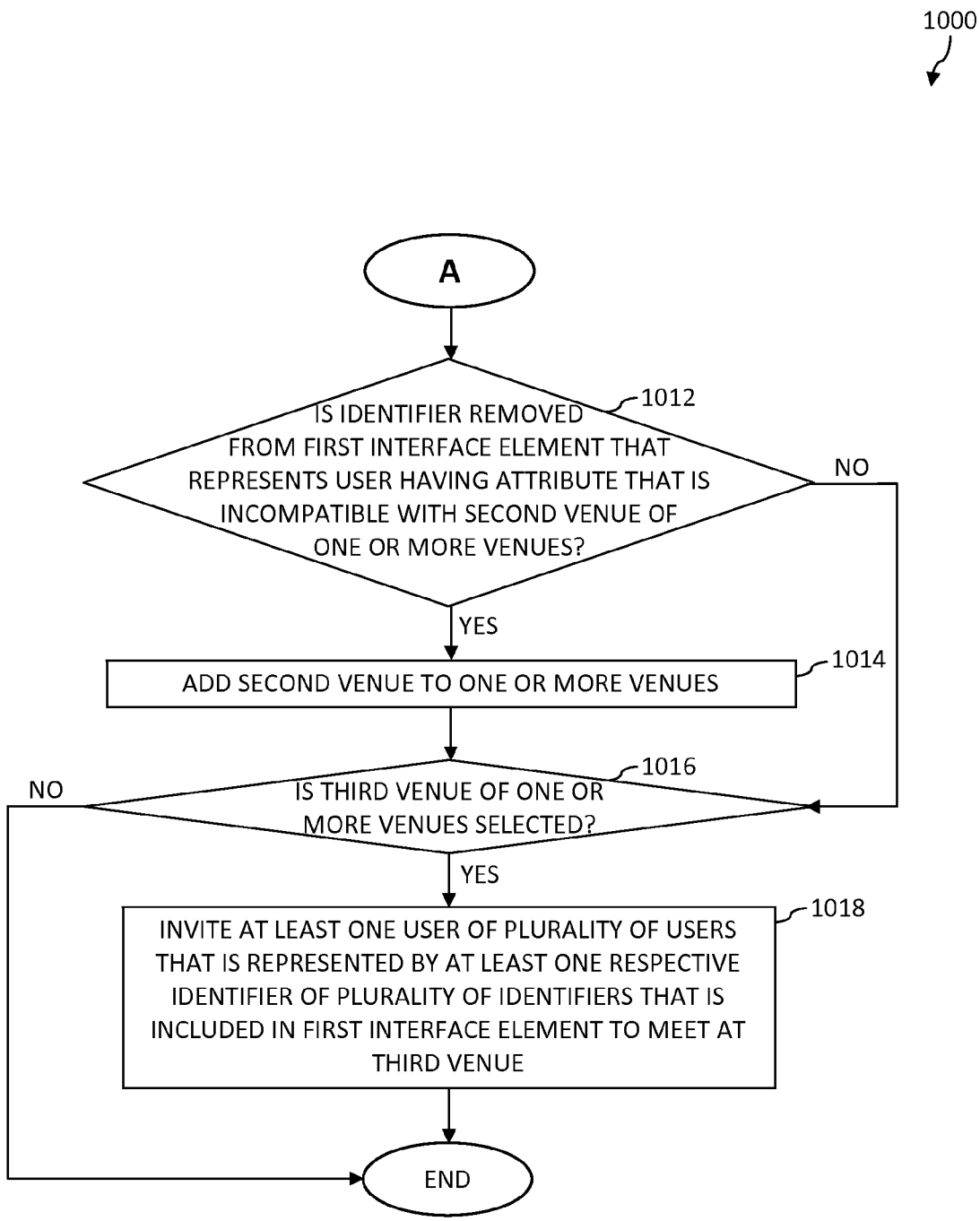

FIGS. 10A-10B depict respective portions of a flowchart of still another method for taking action upon users in a social networking system with respect to a purpose based on compatibility of the users to the purpose in accordance with an embodiment described herein.

FIGS. 12, 13, 14, and 17 are illustrations of example graphical user interfaces (GUIs) in accordance with embodiments described herein.

Figure 15A:
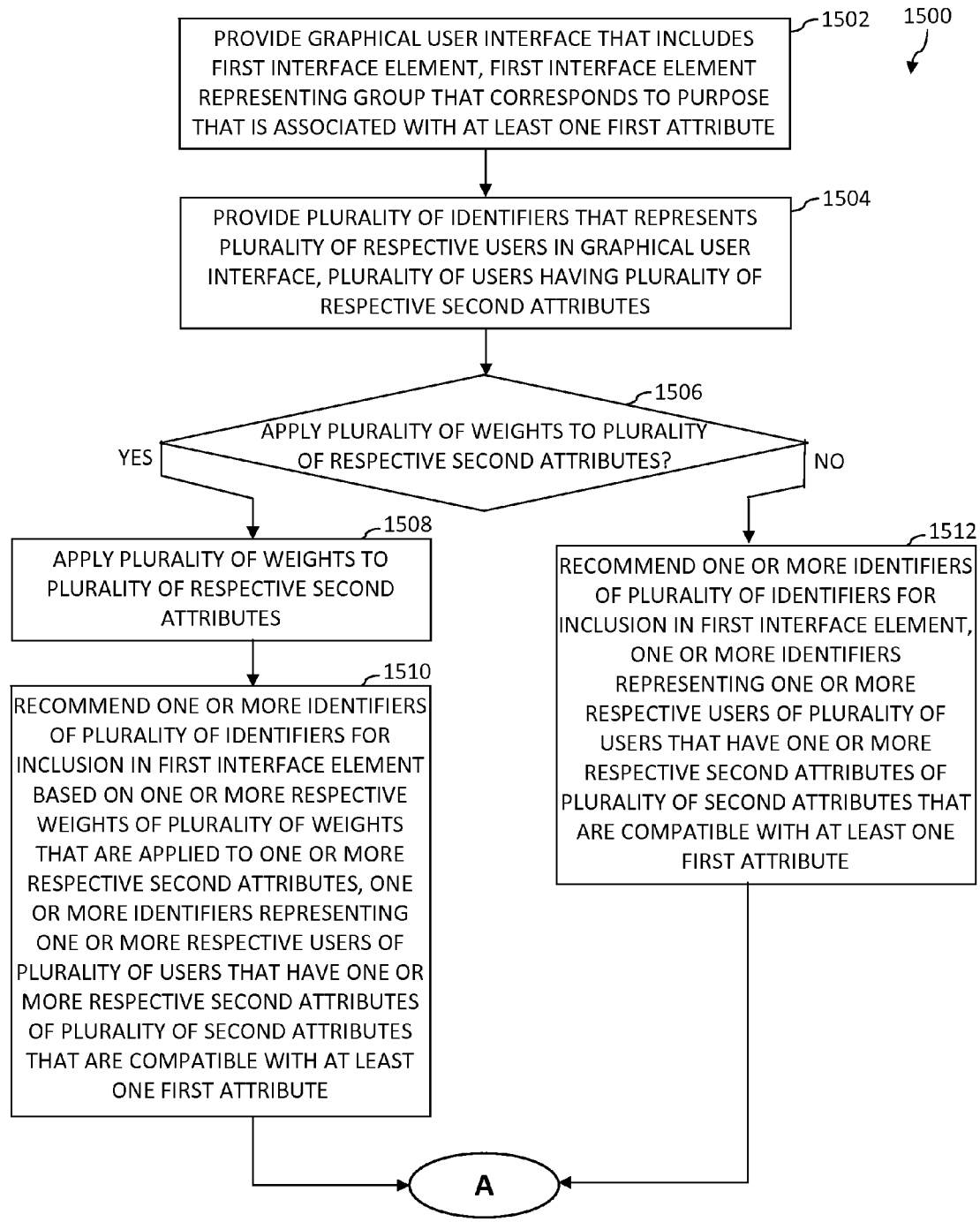
Figure 15B:
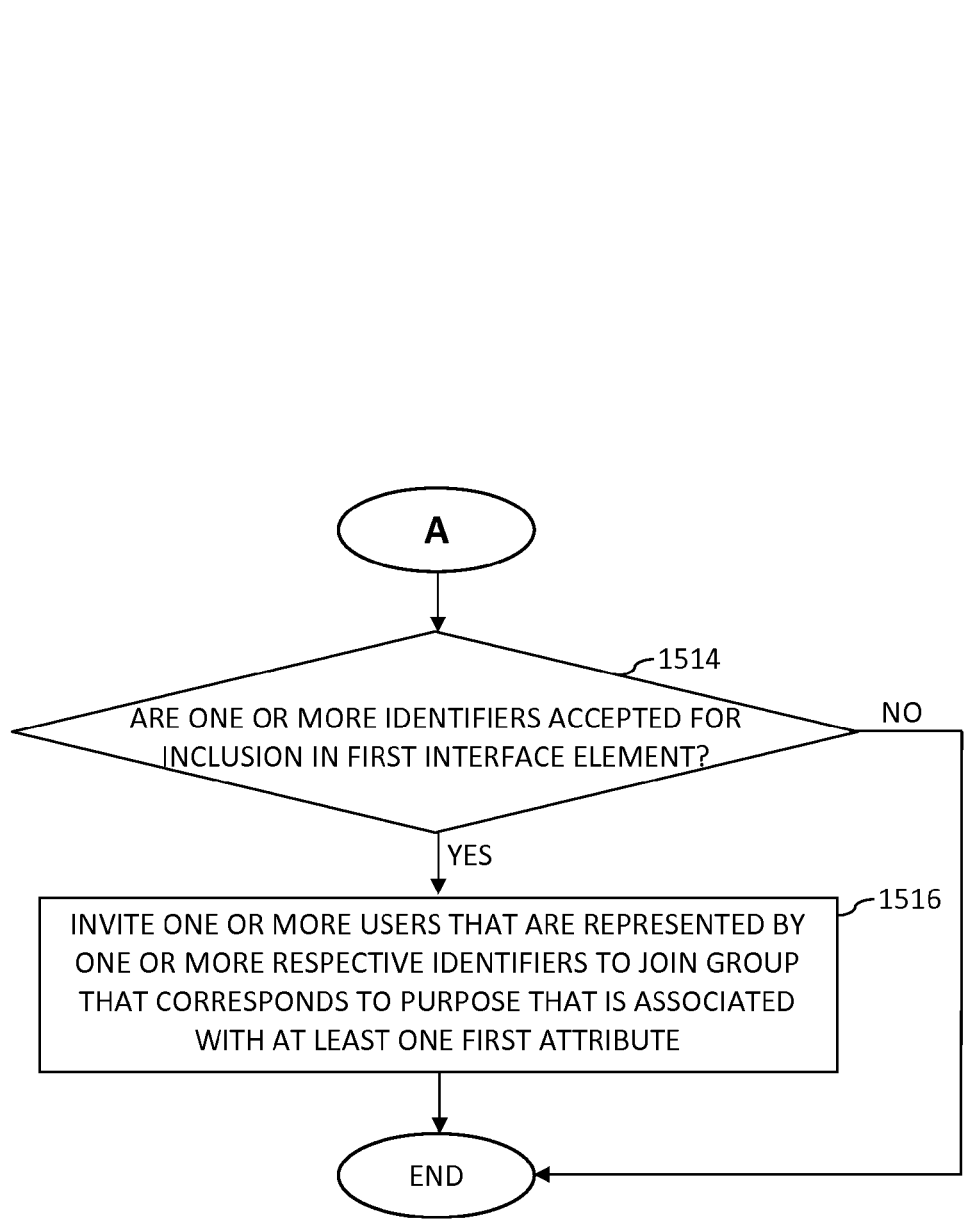

FIGS. 15A-15B depict respective portions of a flowchart of yet still another method for taking action upon users in a social networking system with respect to a purpose based on compatibility of the users to the purpose in accordance with an embodiment described herein.

Figure 18:
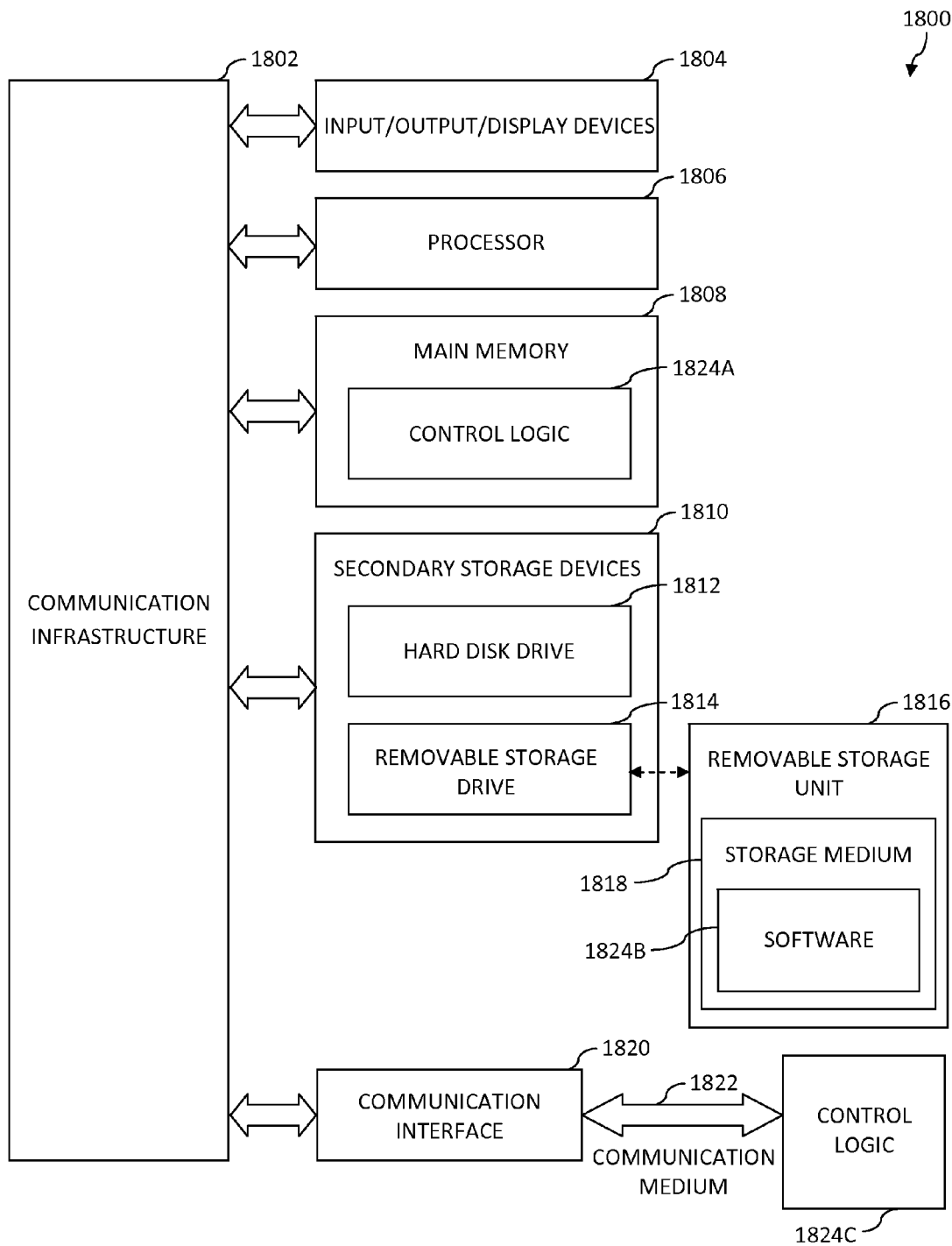

FIG. 18 is a block diagram of a computer that may be used to implement one or more aspects of the present invention.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments for Taking Action upon Users in a Social Networking System with Respect to a Purpose Based on Compatibility of the Users to the Purpose Example embodiments are capable of taking action upon users in a social networking system with respect to a purpose based on compatibility of the users to the purpose. In some example embodiments, the action is further based on compatibility of the users and the purpose with a venue. Example actions include but are not limited to recommending users for a purpose and/or a venue; recommending a purpose for users and/or a venue; recommending a venue for users and/or a purpose; inviting users to join a group, to attend an event, or to perform an action; etc.

In accordance with example embodiments, user attributes are associated with respective users, purpose attributes are associated with a purpose, and venue attributes are associated with a venue (if applicable). For example, a compatibility analysis may be performed with respect to the attributes of the users, the purpose, and/or the venue. In accordance with this example, an action may be taken upon the users (or a subset thereof) based on the results of the compatibility analysis.

In a first example embodiment, user attributes associated with respective users and purpose attributes associated with a purpose are used to determine a venue having venue attributes that are compatible with the user attributes and the purpose attributes. For instance, the venue may be recommended for the users to achieve the purpose.

In a second example embodiment, user attributes associated with respective users and venue attributes associated with a venue are used to determine a purpose having purpose attributes that are compatible with the user attributes and the venue attributes. For example, the purpose may be recommended to be achieved by the users at the venue.

In a third example embodiment, purpose attributes associated with a purpose and venue attributes associated with a venue are used to determine users having respective user attributes that are compatible with the purpose attributes and the venue attributes. For example, the users may be recommended for achieving the purpose at the venue.

In a fourth example embodiment, user attributes associated with respective users are used to determine a purpose having purpose attributes and a venue having venue attributes, such that the user attributes, the purpose attributes, and the venue attributes are compatible. For instance, the purpose and the venue may be recommended, so that the users may attempt to achieve the purpose at the venue.

In a fifth example embodiment, purpose attributes associated with a purpose are used to determine users having user attributes and a venue having venue attributes, such that the purpose attributes, the user attributes, and the venue attributes are compatible. For instance, the users and the venue may be recommended, so that the users may attempt to achieve the purpose at the venue.

In a sixth example embodiment, venue attributes associated with a venue are used to determine a purpose having purpose attributes and users having respective user attributes, such that the venue attributes, the purpose attributes, and the user attributes are compatible. For example, the purpose and the users may be recommended, so that the users may attempt to achieve the purpose at the venue. In accordance with the first through sixth example embodiments, an invitation may be provided to the users to achieve the purpose at the venue.

In a seventh example embodiment, user attributes associated with respective users are used to determine a purpose having purpose attributes that are compatible with the user attributes. For example, the purpose may be recommended to be achieved by the users.

In an eighth example embodiment, purpose attributes associated with a purpose are used to determine users having respective user attributes that are compatible with the purpose attributes. For instance, the users may be recommended for achieving the purpose. In accordance with the seventh and eighth example embodiments, an invitation may be provided to the users to achieve the purpose.

FIG. 1 shows a block diagram of an example social networking system 100 in accordance with an embodiment described herein. As shown in FIG. 1, social networking system 100 includes a network manager 102 and a social network 104. Social network 104 is communicatively connected to network manager 102 by a communication interface 106. Communication among user systems 108A-108N and communications between network manager 102 and any of user systems 108A-108N is performed in accordance with well-known network communication protocols. Each of the elements of system 100 is described in detail below.

Social network 104 is an online social network or a combination of social networks, that includes a community of users (network participating persons) who interact within social network 104 using respective user systems 108A-108N. Each of the user systems 108A-108N is a computer, a personal digital assistant (PDA), or other processing system, including one or more processors, which is configured to enable a user to provide social networking updates to other users in social network 104. For instance, each of the user systems 108A-108N includes a client 110 (e.g., a Web browser), which enables a respective user to provide such updates.

Social network 104 may include any number of user systems 108-108N, including hundreds, thousands, or even millions of user systems 108A-108N. Social network 104 operates within a communication network, such as a local area network (LAN), a wide area network (WAN), or a combination of networks, such as the Internet. For example, social network 104 may be based in the World Wide Web. The communication network enables communication between user systems 108A-108N. Social network 104 may enable one or more ways for users to interact, including enabling communications between user systems 108A-108N through one or more of blogging, discussion groups, email, file sharing, instant messaging, online chat, tweeting, video, voice chat, and/or other user communication mechanisms.

Network manager 102 is a computer (e.g., Web server) or other processing system, including one or more processors, which is configured to take actions upon users in social networking system 100. Network manager 102 is capable of performing a compatibility analysis to determine users, purposes, and/or venues that are compatible with one another based on attributes associated with the respective users, purposes, and/or venues. For instance, network manager 102 may perform the compatibility analysis in response to receiving a request from a user via communication interface 106, though the scope of the example embodiments is not limited in this respect. The user may generate the request using a client 110, for example.

Example attributes of a user include but are not limited to interests (e.g., traveling, hiking, art, etc.), preferences (e.g., four star hotel, educational activities, etc.), and/or requirements (e.g., peanut allergy, acrophobia, etc.) of the user. Example attributes of a purpose include but are not limited to breakfast, lunch, dinner, food, tomorrow, weekend, movie, golf, tennis, happy hour, birthday party, volunteer, study session, girls' night out, museum tour, cruise, shopping, vacation, business strategy meeting, etc. A venue may be a restaurant, a golf course, a bar, a hotel, a library, a museum, a retail store, a mall, a ship, a country, a state, a city, another geographical region, etc. Attributes of a venue may be dependent on the type of venue. For instance, attributes of a restaurant may include steak, burger, ice cream, five star, business casual, sea food, Chinese, gourmet, outdoor seating, or any other suitable attribute.

The attributes of the respective users, purposes, and/or venues may be represented by metadata associated with the respective users, purposes, and/or venues. A tag is a type of metadata that enables a user, purpose, or venue that is represented by the tag to be found in accordance with a browsing or searching operation. Some example embodiments are described herein with reference to tags and are not intended to be limiting. Persons skilled in the relevant art(s) will recognize that any suitable type of metadata may be used to represent a user, purpose, and/or venue.

According to an example embodiment, tags may include respective polarity indicators. A polarity indicator that is included in a tag may indicate whether an attribute that is represented by the tag is compatible with the user, purpose, or venue with which the tag is associated. For example, the polarity indicator may specify a positive polarity, a negative polarity, or an unknown polarity. In accordance with this example, a polarity indicator that specifies a positive polarity may indicate that the attribute represented by the respective tag is compatible with the user, purpose, or venue. For instance, a tag that represents a user attribute of "peanuts" may include a polarity indicator that specifies a positive polarity to indicate that the user likes peanuts. A polarity indicator that specifies a negative polarity may indicate that the attribute represented by the respective tag is not compatible with the user, purpose, or venue. For instance, a tag that represents a user attribute of "peanuts" may include a polarity indicator that specifies a negative polarity to indicate that the user does not like peanuts, that the user is allergic to peanuts, etc. A polarity indicator that specifies an unknown polarity may indicate that it is unknown whether the attribute represented by the respective tag is compatible with the user, purpose, or venue. For instance, a tag that represents a user attribute of "peanuts" may include a polarity indicator that specifies an unknown polarity to indicate that it is unknown whether the user likes peanuts, whether the user is allergic to peanuts, etc. Further discussion of tags that are associated with respective polarity indicators is provided below with reference to FIG. 2.

In another example, a tag may be a positive tag or a negative tag. In accordance with this example, a polarity indicator need not be used to indicate whether an attribute is compatible with a user, purpose, or venue. For instance, a positive tag may indicate that an attribute that is represented by the tag is compatible with the user, purpose, or venue with which the tag is associated. A negative tag may indicate that an attribute that is represented by the tag is not compatible with the user, purpose, or venue with which the tag is associated. The distinction between a positive tag and a negative tag may be derived from the contents of the tag. For instance, a user tag of "peanuts" may indicate that the user likes peanuts; whereas, a user tag of "no peanuts" may indicate that the user does not like peanuts, that the user is allergic to peanuts, etc. Accordingly, the user tag of "peanuts" may be referred to as a positive tag, and the user tag of "no peanuts" may be referred to as a negative tag. Further discussion of positive tags and negative tags is provided below with reference to FIG. 3.

Network manager 102 is further capable of taking action upon the users (or a subset thereof) in social networking system 100 based on the compatibility analysis. Example actions include but are not limited to recommending user(s), purpose(s), and/or venue(s); inviting user(s) to join a group, to attend an event, or to perform an action; etc. Techniques for taking action upon users in a social networking system are discussed in further detail below with reference to FIGS. 4, 5, 6A-6B, 7-9, 10A-10B, 11-14, 15A-15B, 16, and 17.

Network manager 102 may be configured to provide a graphical user interface that includes interface elements that represent respective users, purposes, and/or venues. In accordance with an example implementation, network manager 102 performs a compatibility analysis with respect to the users, purposes, and/or venues based on the configuration of the interface elements. For example, proximity of the interface elements to one another may determine which users, purposes, and/or venues are included in the compatibility analysis. In accordance with this example, overlapping interface elements may indicate that the compatibility of those interface elements is to be determined in the compatibility analysis.

In accordance with another example implementation, the configuration of the interface elements is determined based on a compatibility analysis that is performed with respect to the users, purposes, and/or venues. For example, the proximity of the interface elements to one another in the graphical user interface may be based on the compatibility analysis. In accordance with this example, a closer proximity may represent a greater compatibility. A farther proximity may represent a lesser compatibility.

At least some of the interface elements may be movable in the graphical user interface by a user via a client 110, for example, though the scope of the example embodiments is not limited in this respect. For instance, moving an interface element in the graphical user interface may cause an update indicator that specifies an updated configuration of the interface elements to be provided by the client 110 to network manager 102.

Network manager 102 may perform a compatibility analysis with respect to the users, purposes, and/or venues based on the updated configuration of the interface elements. For instance, network manager 102 may be configured to automatically perform the compatibility analysis in response to receipt of the update indicator that specifies the updated configuration. Network manager 102 may be further configured to take an action based on results of the compatibility analysis regarding the updated configuration. For instance, network manager 102 may be configured to automatically take the action in response to performance of the compatibility analysis that is based on the updated configuration. Techniques for using a graphical user interface in accordance with a compatibility analysis are discussed in further detail below with reference to FIGS. 10A-10B, 11-14, 15A-15B, 16, and 17.

In accordance with example embodiments, network manager 102 is further configured to manage communications in social networking system 100. For example, network manager 102 may handle delivery of recommendations and/or invitations to users in social networking system 100 based on compatibility analyses regarding the users. In another example, network manager 102 may handle delivery of social networking updates among users in social networking system 100.

In order for a network manager 102 to determine compatibility of a plurality of users as a whole with a purpose and/or a venue, user domain tags that represent respective cumulative attributes of the plurality of users may be determined, though the scope of the example embodiments is not limited in this respect. For instance, a first plurality of attributes, which is associated with the plurality of respective users, may pertain to peanuts. The first plurality of attributes may be analyzed to determine a cumulative peanut attribute associated with the plurality of users as a whole. A second plurality of attributes, which is associated with the plurality of respective users, may pertain to hiking. The second plurality of attributes may be analyzed to determine a cumulative hiking attribute associated with the plurality of users as a whole, and so on. The example attributes described herein are provided for illustrative purposes and are not intended to be limiting. It will be recognized that example embodiments may utilize any suitable attributes.

Figure 2:
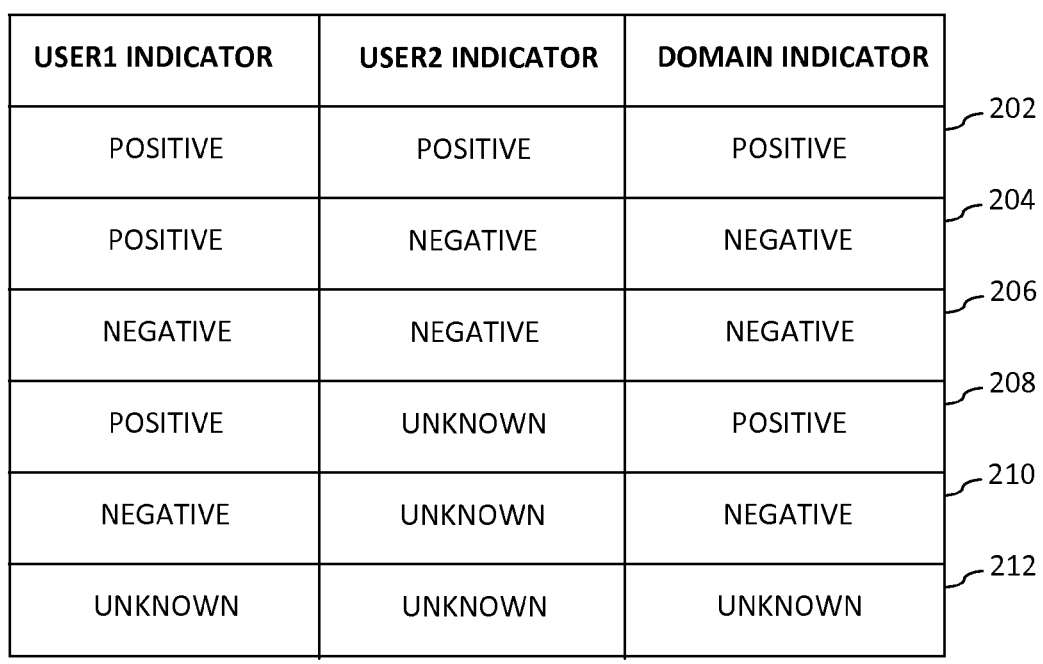
FIG. 2 depicts a truth table for determining polarity indicators associated with respective user domain tags (i.e., user domain indicators) corresponding to a plurality of users based on polarity indicators that are included in tags of the respective users (i.e., user indicators) in accordance with an embodiment described herein.

FIG. 2 depicts a truth table 200 for determining polarity indicators associated with respective user domain tags (i.e., user domain indicators) corresponding to a plurality of users based on polarity indicators that are included in tags of the respective users (i.e., user indicators) in accordance with an embodiment described herein. Truth table 200 includes three columns labeled "User1 Indicator", "User2 Indicator", and "User Domain Indicator", respectively. Each entry in the column labeled User1 Indicator represents a polarity specified by a polarity indicator corresponding to User1 (i.e., a User1 indicator). Each entry in the column labeled User2 Indicator represents a polarity specified by a polarity indicator corresponding to User2 (e.g., a User2 indicator). Each entry in the column labeled User Domain Indicator represents a polarity specified by a user domain indicator that is determined based on the entries in the respective User1 Indicator and User2 Indicator columns in the same row.

As shown in FIG. 2, truth table 200 includes six rows respectively labeled 202, 204, 206, 208, 210, and 212. In row 202, the User1 indicator specifies a positive polarity, and the User2 indicator specifies a positive polarity, resulting in a user domain indicator that represents a positive polarity. In row 204, the User1 indicator specifies a positive polarity, and the User2 indicator specifies a negative polarity, resulting in a user domain indicator that represents a negative polarity. It will be recognized based on the teachings herein that if any one or more user indicators that are used to determine a user domain indicator represent a negative polarity, the resulting user domain indicator represents a negative polarity.

In row 206, the User1 indicator specifies a negative polarity, and the User2 indicator specifies a negative polarity, resulting in a user domain indicator that represents a negative polarity. In row 208, the User1 indicator specifies a positive polarity, and the User2 indicator specifies an unknown polarity, resulting in a user domain indicator that represents a positive polarity. It will be recognized that if any one or more user indicators that are used to determine a user domain indicator represent a positive polarity and none of the user indicators represent a negative polarity, the resulting user domain indicator represents a positive polarity.

In row 210, the User1 indicator specifies a negative polarity, and the User2 indicator specifies an unknown polarity, resulting in a user domain indicator that represents a negative polarity. In row 212, the User1 indicator specifies an unknown polarity, and the User2 indicator specifies an unknown polarity, resulting in a user domain indicator that represents an unknown polarity. It will be recognized that if all of the user indicators that are used to determine a user domain indicator represent an unknown polarity, the resulting user domain indicator represents an unknown polarity.

Truth table 200 is implemented with regard to two users (i.e., User1 and User2) for purposes of illustration and is not intended to be limiting. It will be recognized that truth table 200 may be implemented with regard to any number of users. Accordingly, the techniques described herein for determining user domain indicators may be implemented with respect to any number of user indicators.

According to an example embodiment, a first tag is associated with a user (or a plurality of users), a second tag is associated with a purpose, and a third tag is associated with a venue. If each of the first, second, and third tags includes a respective polarity indicator, the tags are deemed to be compatible so long as the indicators do not include a polarity indicator that represents a positive polarity and a polarity indicator that represents a negative polarity. For example, the first, second, and third tags are deemed to be compatible if the tags include any combination of polarity indicator(s) representing a positive polarity and/or polarity indicator(s) representing an unknown polarity. In another example, the first, second, and third tags are deemed to be compatible if the tags include any combination of polarity indicator(s) representing a negative polarity and/or polarity indicator(s) representing an unknown polarity. However, the first, second, and third tags are not deemed to be compatible if the tags include polarity indicator(s) representing a positive polarity and polarity indicator(s) representing a negative polarity.

The compatibility analysis technique described above with respect to the first, second, and third tags is one example technique and is not intended to be limiting. Other techniques for determining compatibility are within the scope of the example embodiments.

Figure 3:
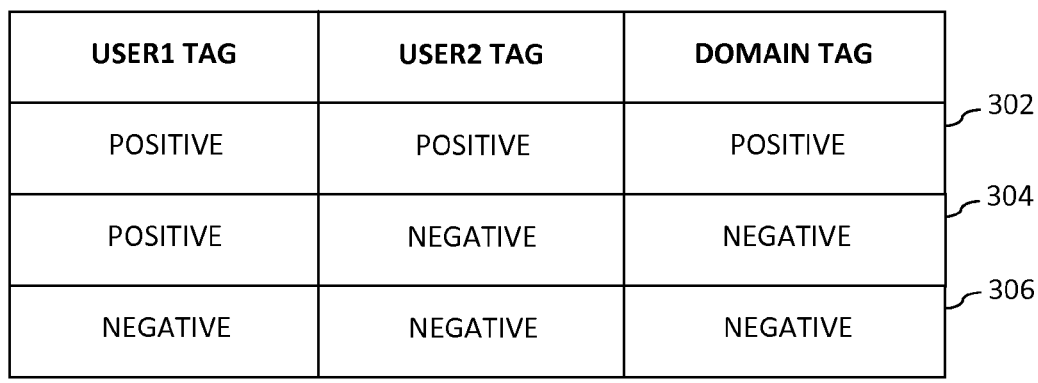
FIG. 3 depicts a truth table for determining whether user domain tags associated with a plurality of users are positive tags or negative tags based on respective positive and/or negative tags of the respective users in accordance with an embodiment described herein.

FIG. 3 depicts a truth table 300 for determining whether user domain tags associated with a plurality of users are positive tags or negative tags based on respective positive and/or negative tags of the respective users in accordance with an embodiment described herein. Truth table 300 includes three columns labeled "User1 Tag", "User2 Tag", and "Domain Tag", respectively. Each entry in the column labeled User1 Tag represents either a positive tag or a negative tag corresponding to User1. Each entry in the column labeled User2 Tag represents either a positive tag or a negative tag corresponding to User2. Each entry in the column labeled Domain Tag represents either a positive user domain tag or a negative user domain tag that is determined based on the entries in the respective User1 Tag and User2 Tag columns in the same row.

As shown in FIG. 3, truth table 300 includes three rows respectively labeled 302, 304, and 306. In row 302, the User1 tag is a positive tag, and the User2 tag is a positive tag, resulting in a positive user domain tag. In row 304, the User1 tag is a positive tag, and the User2 tag is a negative tag, resulting in a negative user domain tag. In row 306, the User1 tag is a negative tag, and the User2 tag is a negative tag, resulting in a negative user domain tag. It will be recognized based on the teachings herein that if any one or more of the user tags, which are used to determine whether a user domain tag is a positive tag or a negative tag, is a negative tag, the resulting user domain tag is a negative tag. It will also be recognized that if all of the user tags are positive tags, the resulting user domain tag is a positive tag.

Truth table 300 is implemented with regard to two users (i.e., User1 and User2) for purposes of illustration and is not intended to be limiting. It will be recognized that truth table 300 may be implemented with regard to any number of users. Accordingly, the techniques described herein for determining whether user domain tags are positive tags or negative tags may be implemented with respect to any number of user tags.

According to an example embodiment, a first tag is associated with a user (or a plurality of users), a second tag is associated with a purpose, and a third tag is associated with a venue. The first, second, and third tags are deemed to be compatible so long as the first, second, and third tags are all positive tags or the first, second, and third tags are all negative tags. However, the first, second, and third tags are not deemed to be compatible if the tags include positive tag(s) and negative tag(s).

The compatibility analysis technique described above with respect to the first, second, and third tags is one example technique and is not intended to be limiting. Other techniques for determining compatibility are within the scope of the example embodiments.

Figure 4:
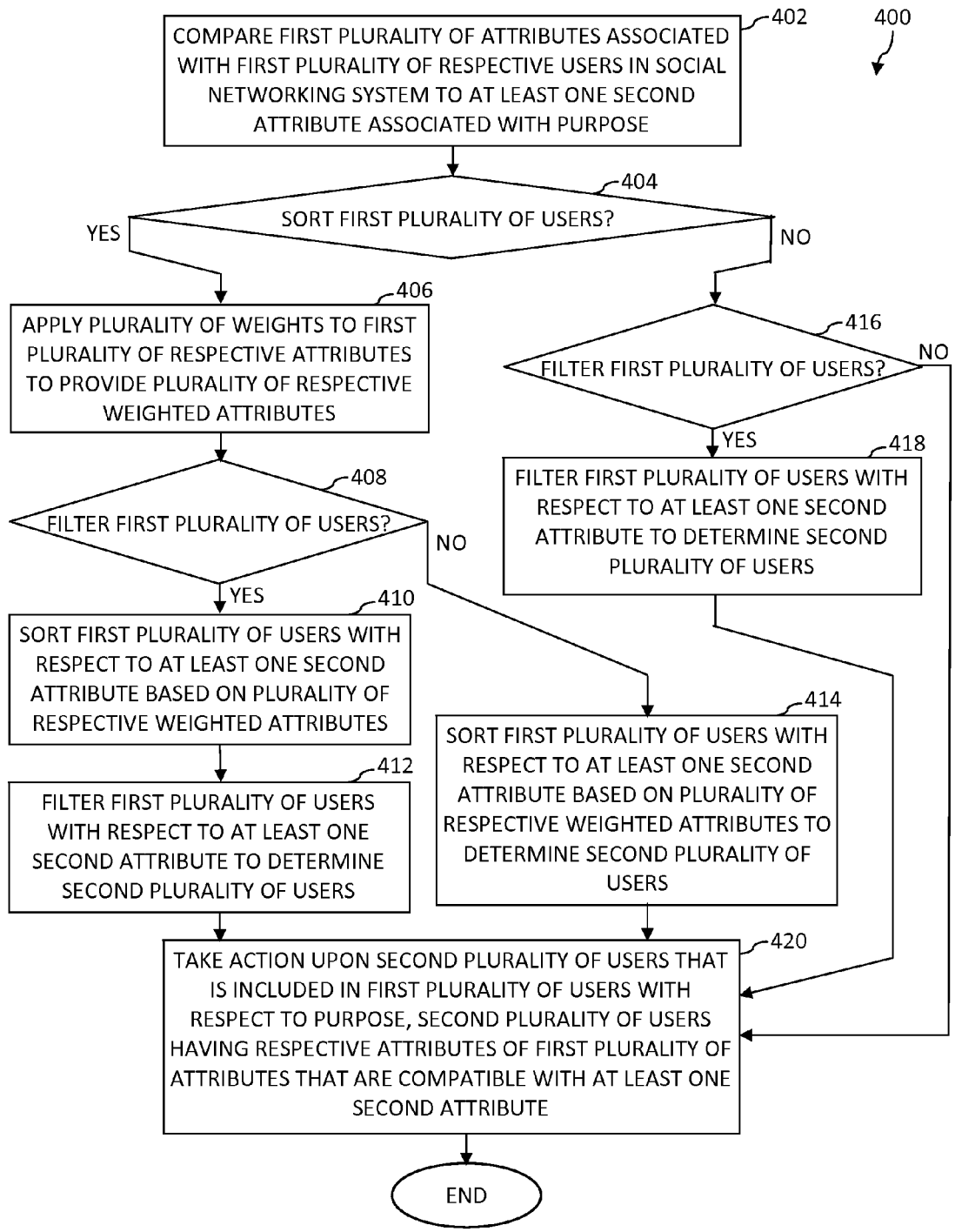
FIG. 4 depicts a flowchart of a method for taking action upon users in a social networking system with respect to a purpose based on compatibility of the users to the purpose in accordance with an embodiment described herein.

FIG. 4 depicts a flowchart 400 of a method for taking action upon users in a social networking system with respect to a purpose based on compatibility of the users to the purpose in accordance with an embodiment described herein. Flowchart 400 may be performed by network manager 102 of computer system 100 shown in FIG. 1, for example. For illustrative purposes, flowchart 400 is described with respect to a network manager 102' shown in FIG. 5, which is an example of a network manager 102, according to an embodiment. In this document, whenever a prime is used to modify a reference number, the modified reference number indicates an example (or alternate) implementation of the element that corresponds to the reference number.

Figure 5:
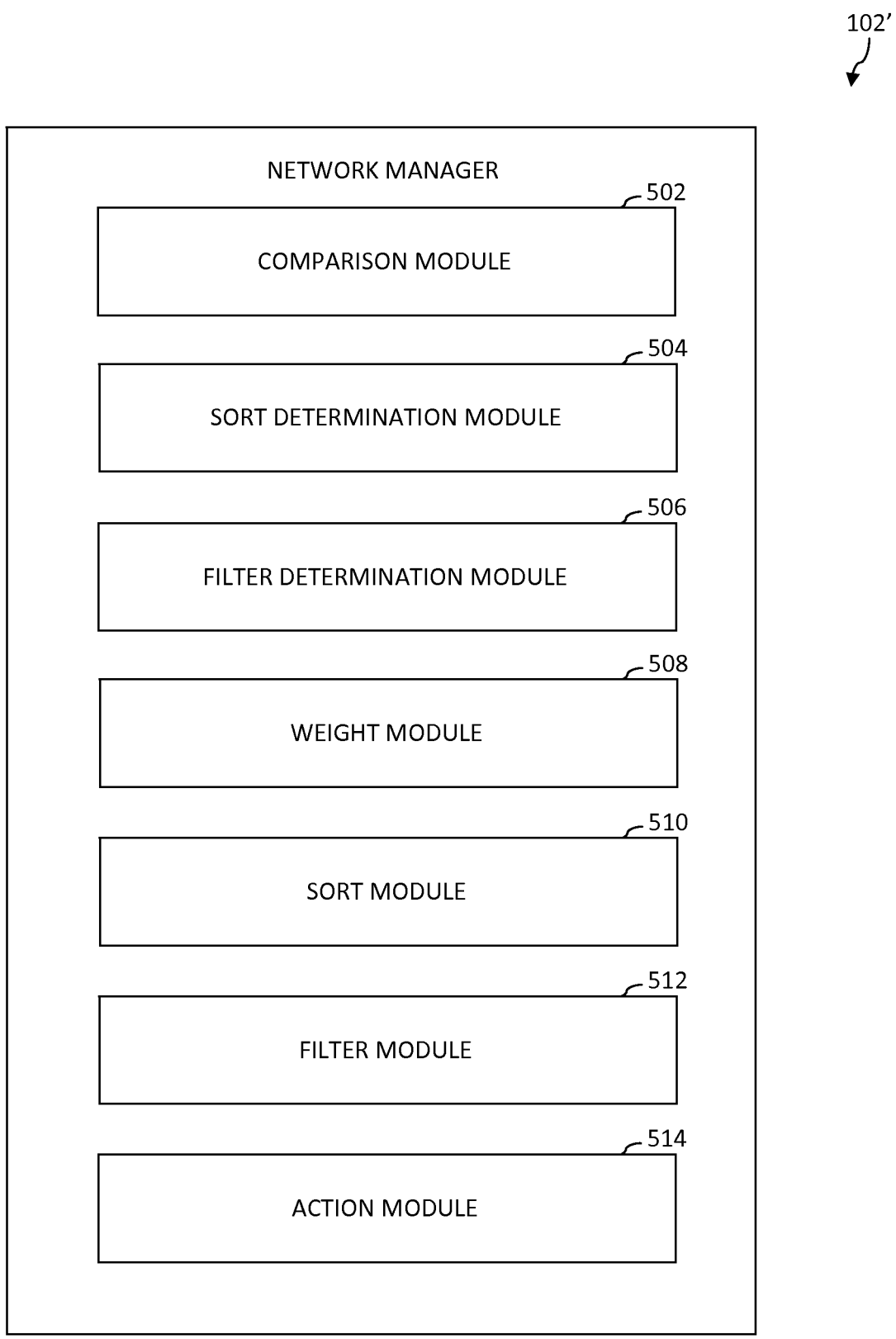

As shown in FIG. 5, network manager 102' includes a comparison module 502, a sort determination module 504, a filter determination module 506, a weight module 508, a sort module 510, a filter module 512, and an action module 514. Further structural and operational embodiments will be apparent to persons skilled in the relevant art(s) based on the discussion regarding flowchart 400. Flowchart 400 is described as follows.

As shown in FIG. 4, the method of flowchart 400 begins at step 402. In step 402, a first plurality of attributes associated with a first plurality of respective users in a social networking system is compared to at least one second attribute associated with a purpose. In an example implementation, comparison module 502 compares the first plurality of attributes to the at least one second attribute.

At step 404, a determination is made whether the first plurality of users is to be sorted. In an example implementation, sort determination module 504 determines whether the first plurality of users is to be sorted. If the first plurality of users is to be sorted, flow continues to step 406. Otherwise, flow continues to step 416.

At step 406, a plurality of weights is applied to the first plurality of respective attributes to provide a plurality of respective weighted attributes. A weight that is applied to an attribute may represent a relevance of that attribute with respect to the at least one second attribute that is associated with the purpose. For instance, if the at least one second attribute includes "Steak Dinner", an attribute of "steak" that is associated with a user may have a greater weight than an attribute of "hamburger" that is associated with the same user or a different user, though the attribute of "hamburger" may nevertheless be relevant to the "Steak Dinner" attribute. In an example implementation, weight module 508 applies the plurality of weights to the first plurality of respective attributes.

At step 408, a determination is made whether the first plurality of users is to be filtered. In an example implementation, filter determination module 506 determines whether the first plurality of user is to be filtered. If the first plurality of users is to be filtered, flow continues to step 410. Otherwise, flow continues to step 414.

At step 410, the first plurality of users is sorted with respect to the at least one second attribute based on the plurality of respective weighted attributes. For instance, the first plurality of users may be arranged in an order based on the weights associated with the respective weighted attributes. In an example implementation, sort module 510 sorts the first plurality of users with respect to the at least one second attribute.

At step 412, the first plurality of users is filtered with respect to the at least one second attribute to determine a second plurality of users. Any of a variety of filtering techniques, including the filtering techniques described above with reference to FIGS. 2 and 3, may be used to filter the first plurality of users with respect to the at least one second attribute associated with the purpose. For example, the weights associated with the respective weighted attributes may be compared to a threshold weight. In accordance with this example, the first plurality of users may be filtered based on whether the weights that are applied to the respective users' attributes exceed the threshold weight. For instance, a user associated with an attribute having a weight that exceeds the threshold weight may be included in the second plurality of users. On the other hand, a user associated with an attribute having a weight that does not exceed the threshold weight may not be included in the second plurality of users. In an example implementation, filter module 512 filters the first plurality of users with respect to the at least one second attribute.

At step 414, the first plurality of users is sorted with respect to the at least one second attribute based on the plurality of respective weighted attributes to determine the second plurality of users. Accordingly, at step 414, the second plurality of users is the same as the first plurality of users, though the order of the users in the second plurality of users may be arranged based on the weights associated with the respective weighted attributes. In an example implementation, sort module 510 sorts the first plurality of users with respect to the at least one second attribute.

At step 416, a determination is made whether the first plurality of users is to be filtered. In an example implementation, filter determination module 506 determines whether the first plurality of users is to be filtered. If the first plurality of user is to be filtered, flow continues to step 418. Otherwise, flow continues to step 420.

At step 418, the first plurality of users is filtered with respect to the at least one second attribute to determine the second plurality of users. Any of a variety of filtering techniques, including the filtering techniques described above with reference to FIGS. 2 and 3, may be used to filter the first plurality of users with respect to the at least one second attribute associated with the purpose. In an example implementation, filter module 512 filters the first plurality of users with respect to the at least one second attribute.

Upon completion of any of steps 412, 414, or 418, flow continues to step 420. At step 420, action is taken upon the second plurality of users that is included in the first plurality of users with respect to the purpose. The second plurality of users has respective attributes of the first plurality of attributes that are compatible with the at least one second attribute. For example, the second plurality of users may be recommended for the purpose and/or for a venue that is compatible with the purpose. In another example, the purpose may be recommended for the second plurality of users and/or for a venue that is compatible with the second plurality of users. In yet another example, a venue may be recommended for the second plurality of users and/or for the purpose. In still another example, the second plurality of users may be invited to join a group, to attend an event, or to perform an action, etc. that pertains to the purpose. In an example implementation, action module 514 takes the action upon the second plurality of users.

In some example embodiments, one or more steps 402, 404, 406, 408, 410, 412, 414, 416, 418, and/or 420 of flowchart 400 may not be performed. Moreover, steps in addition to or in lieu of steps 402, 404, 406, 408, 410, 412, 414, 416, 418, and/or 420 may be performed.

It will be recognized that network manager 102' may not include one or more of comparison module 502, sort determination module 504, filter determination module 506, weight module 508, sort module 510, filter module 512, and/or action module 514. Furthermore, network manager 102' may include modules in addition to or in lieu of comparison module 502, sort determination module 504, filter determination module 506, weight module 508, sort module 510, filter module 512, and/or action module 514.

FIGS. 6A-6B depict respective portions of a flowchart 600 of another method for taking action upon users in a social networking system with respect to a purpose based on compatibility of the users to the purpose in accordance with an embodiment described herein. Flowchart 600 may be performed by network manager 102 of computer system 100 shown in FIG. 1, for example. For illustrative purposes, flowchart 600 is described with respect to a network manager 102" shown in FIG. 7, which is an example of a network manager 102, according to an embodiment.

Figure 7:
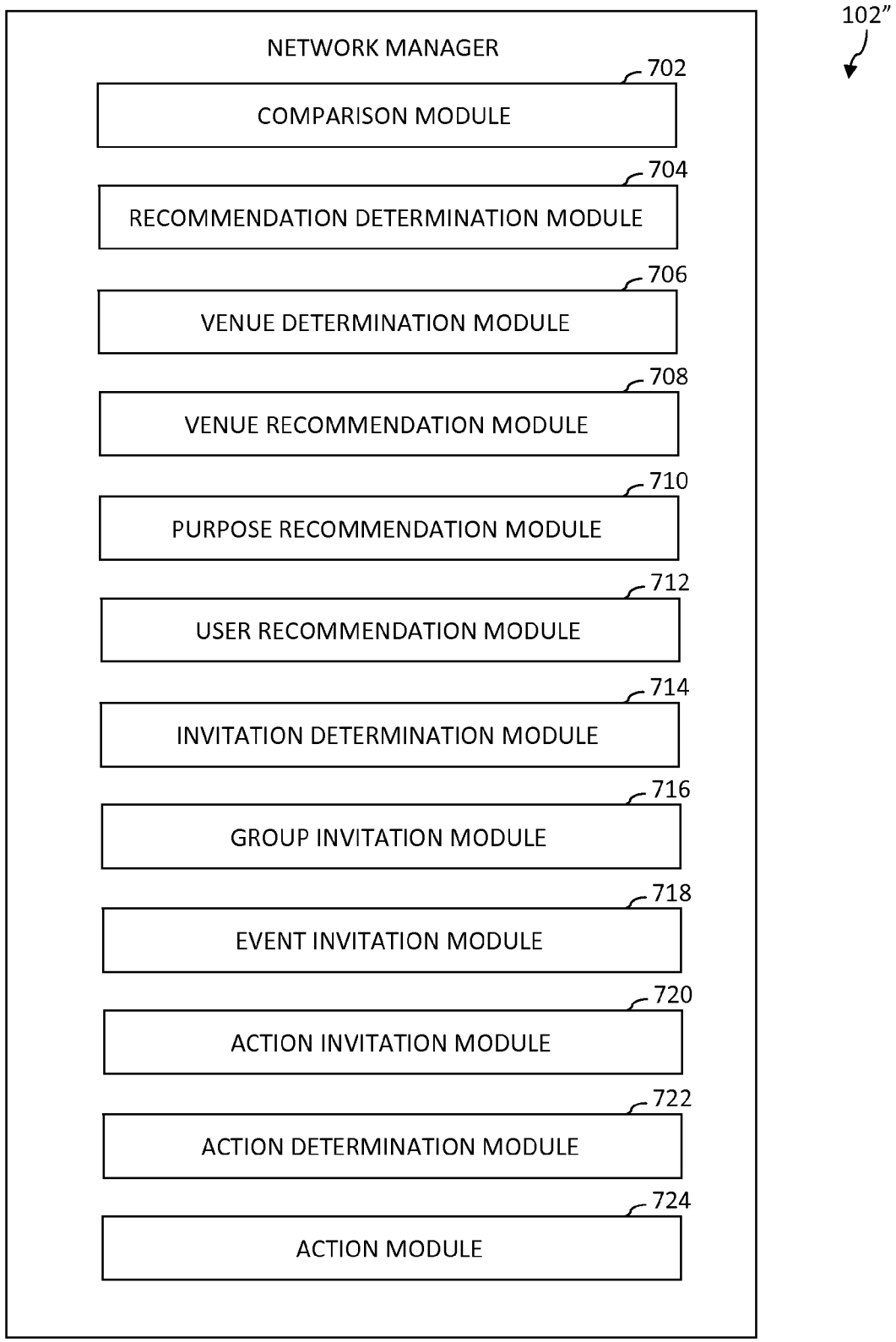

As shown in FIG. 7, network manager 102" includes a comparison module 702, a recommendation determination module 704, a venue determination module 706, a venue recommendation module 708, a purpose recommendation module 710, a user recommendation module 712, an invitation determination module 714, a group invitation module 716, an event invitation module 718, an action invitation module 720, an action determination module 722, and an action module 724. Further structural and operational embodiments will be apparent to persons skilled in the relevant art(s) based on the discussion regarding flowchart 600. Flowchart 600 is described as follows.

As shown in FIG. 6A, the method of flowchart 600 begins at step 602. In step 602, a first plurality of attributes associated with a first plurality of respective users in a social networking system is compared to at least one second attribute associated with a purpose. The first plurality of users includes a second plurality of users having respective attributes of the first plurality of attributes that are compatible with the at least one second attribute. In an example implementation, comparison module 702 compares the first plurality of attributes to the at least one second attribute.

At step 604, a determination is made whether a venue is to be recommended. In an example implementation, recommendation determination module 704 determines whether a venue is to be recommended. If a venue is to be recommended, flow continues to step 606. Otherwise, flow continues to step 610.

At step 606, a venue having a third attribute that is compatible with the attributes of the second plurality of users and the at least one second attribute associated with the purpose is determined. In an example implementation, venue determination module 706 determines the venue.

At step 608, a venue at which the second plurality of users is to achieve the purpose is recommended. In an example implementation, venue recommendation module 708 recommends the venue.

At step 610, a determination is made whether a purpose is to be recommended. In an example implementation, recommendation determination module 704 determines whether a purpose is to be recommended. If a purpose is to be recommended, flow continues to step 612. Otherwise, flow continues to step 614, which is shown in FIG. 6B.

At step 612, the purpose that is associated with the at least one second attribute is recommended to be achieved by the second plurality of users. In an example implementation, purpose recommendation module 710 recommends the purpose that is associated with the at least one second attribute to be achieved by the second plurality of users.

At step 614, a determination is made whether user(s) are to be recommended. In an example implementation, recommendation determination module 704 determines whether user(s) are to be recommended. If user(s) are to be recommended, flow continues to step 616. Otherwise, flow continues to step 618.

At step 616, the second plurality of users is recommended for achieving the purpose. In an example implementation, user recommendation module 712 recommends the second plurality of users for achieving the purpose.

At step 618, a determination is made whether the second plurality of users is to be invited to join a group. In an example implementation, invitation determination module 714 determines whether the second plurality of users is to be invited to join a group. If the second plurality of users is to be invited to join a group, flow continues to step 620. Otherwise, flow continues to step 622.

At step 620, the second plurality of users is invited to join a group that is associated with the purpose. In an example implementation, group invitation module 716 invites the second plurality of users to join the group that is associated with the purpose.

At step 622, a determination is made whether the second plurality of users is to be invited to attend an event. In an example implementation, invitation determination module 714 determines whether the second plurality of users is to be invited to attend an event. If the second plurality of users is to be invited to attend an event, flow continues to step 624. Otherwise, flow continues to step 626.

At step 624, the second plurality of users is invited to attend an event that is associated with the purpose. In an example implementation, event invitation module 718 invites the second plurality of users to attend the event that is associated with the purpose.

At step 626, a determination is made whether the second plurality of users is to be invited to perform an action. In an example implementation, invitation determination module 714 determines whether the second plurality of users is to be invited to perform an action. If the second plurality of users is to be invited to perform an action, flow continues to step 628. Otherwise, flow continues to step 630.

At step 628, the second plurality of users is invited to perform an action that is associated with the purpose. In an example implementation, action invitation module 720 invites the second plurality of users to perform the action that is associated with the purpose.

At step 630, a determination is made whether an action was taken at any of steps 608, 612, 616, 620, 624, or 628. In an example implementation, action determination module 722 determines whether an action was taken at any of steps 608, 612, 616, 620, 624, or 628. If an action was taken at any of steps 608, 612, 616, 620, 624, or 628, flowchart 600 ends. Otherwise, flow continues to step 632.

At step 632, action is taken upon the second plurality of users with respect to the purpose. It will be recognized that the action taken at step 632 is different from any of the actions described with respect to steps 608, 612, 616, 620, 624, and 628. In an example implementation, action module 724 takes the action upon the second plurality of users with respect to the purpose.

In some example embodiments, one or more steps 602, 604, 606, 608, 610, 612, 614, 616, 618, 620, 622, 624, 626, 628, 630, and/or 632 of flowchart 600 may not be performed. Moreover, steps in addition to or in lieu of steps 602, 604, 606, 608, 610, 612, 614, 616, 618, 620, 622, 624, 626, 628, 630, and/or 632 may be performed.

It will be recognized that network manager 102" may not include one or more of comparison module 702, recommendation determination module 704, venue determination module 706, venue recommendation module 708, purpose recommendation module 710, user recommendation module 712, invitation determination module 714, group invitation module 716, event invitation module 718, action invitation module 720, action determination module 722, and/or action module 724. Furthermore, network manager 102" may include modules in addition to or in lieu of comparison module 702, recommendation determination module 704, venue determination module 706, venue recommendation module 708, purpose recommendation module 710, user recommendation module 712, invitation determination module 714, group invitation module 716, event invitation module 718, action invitation module 720, action determination module 722, and/or action module 724.

FIG. 8 depicts a flowchart 800 of a yet another method for taking action upon users in a social networking system with respect to a purpose based on compatibility of the users to the purpose in accordance with an embodiment described herein. Flowchart 800 may be performed by network manager 102 of computer system 100 shown in FIG. 1, for example. For illustrative purposes, flowchart 800 is described with respect to a network manager 102''' shown in FIG. 9, which is an example of a network manager 102, according to an embodiment.

Figure 9:
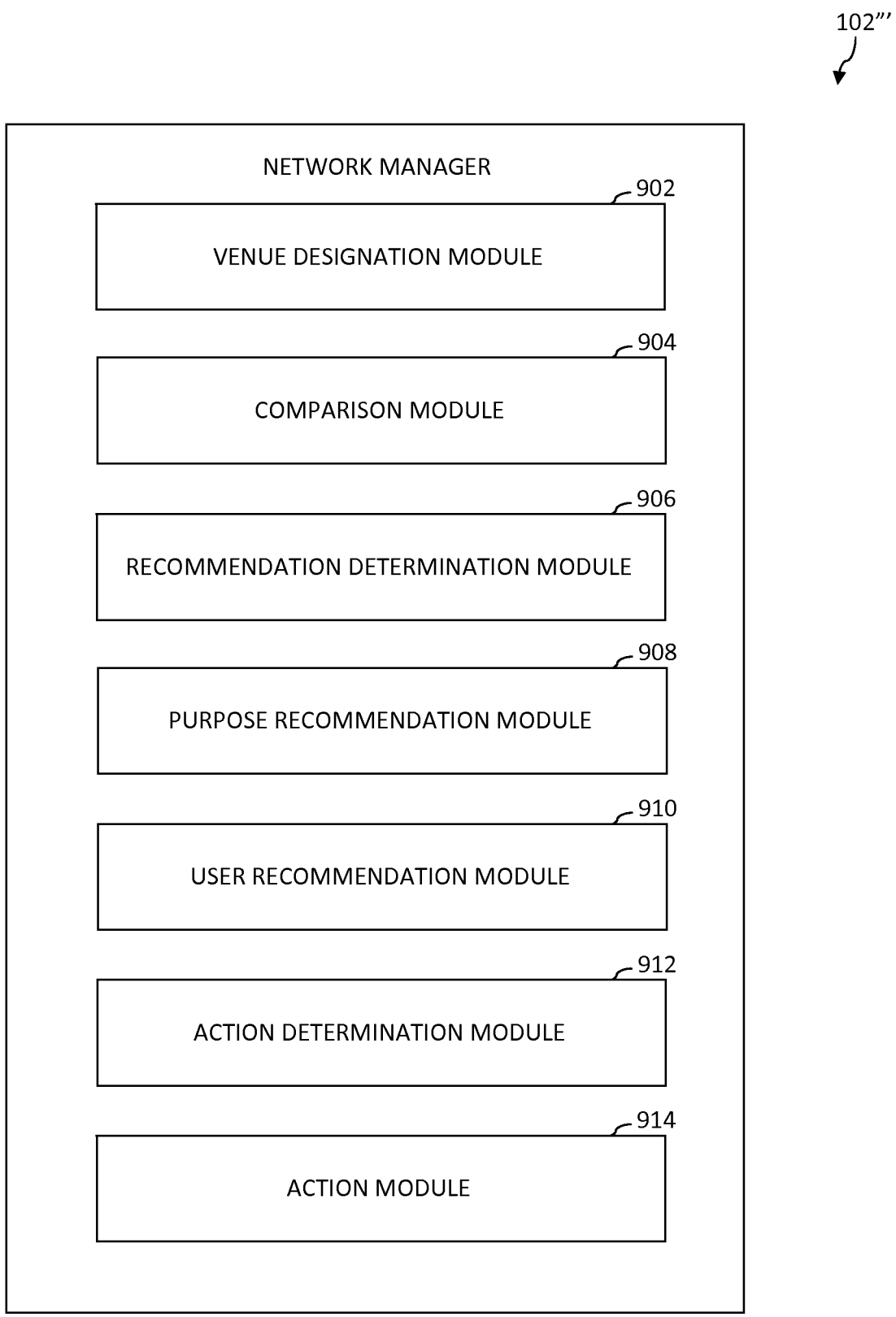

As shown in FIG. 9, network manager 102''' includes a venue designation module 902, a comparison module 904, a recommendation determination module 906, a purpose recommendation module 908, a user recommendation module 910, an action determination module 912, and an action module 914. Further structural and operational embodiments will be apparent to persons skilled in the relevant art(s) based on the discussion regarding flowchart 800. Flowchart 800 is described as follows.

As shown in FIG. 8, the method of flowchart 800 begins at step 802. In step 802, a venue having a third attribute is designated. In an example implementation, venue designation module 902 designates the venue having the third attribute.

At step 804, a first plurality of attributes associated with a first plurality of respective users in a social networking system is compared to at least one second attribute associated with a purpose. The first plurality of users includes a second plurality of users having respective attributes of the first plurality of attributes that are compatible with the at least one second attribute and the third attribute. The at least one second attribute is compatible with the third attribute. In an example implementation, comparison module 904 compares the first plurality of attributes to the at least one second attribute.

At step 806, a determination is made whether a purpose is to be recommended. In an example implementation, recommendation determination module 906 determines whether a purpose is to be recommended. If a purpose is to be recommended, flow continues to step 808. Otherwise, flow continues to step 810.

At step 808, the purpose associated with the at least one second attribute is recommended to be achieved at the venue by the second plurality of users. In an example implementation, purpose recommendation module 908 recommends the purpose associated with the at least one second attribute to be achieved at the venue by the second plurality of users.

At step 810, a determination is made whether user(s) are to be recommended. In an example implementation, recommendation determination module 906 determines whether user(s) are to be recommended. If user(s) are to be recommended, flow continues to step 812. Otherwise, flow continues to step 814.

At step 812, the second plurality of users is recommended for achieving the purpose at the venue. In an example implementation, user recommendation module 910 recommends the second plurality of users for achieving the purpose at the venue.

At step 814, a determination is made whether an action was taken at step 808 or 812. In an example implementation, action determination module 912 determines whether an action was taken at step 808 or 812. If an action was taken at step 808 or 812, flowchart 800 ends. Otherwise, flow continues to step 816.

At step 816, action is taken upon the second plurality of users with respect to the purpose and the venue. It will be recognized that the action taken at step 816 is different from the actions described with respect to steps 808 and 812. In an example implementation, action module 914 takes the action upon the second plurality of users with respect to the purpose and the venue.

In some example embodiments, one or more steps 802, 804, 806, 808, 810, 812, 814, and/or 816 of flowchart 800 may not be performed. Moreover, steps in addition to or in lieu of steps 802, 804, 806, 808, 810, 812, 814, and/or 816 may be performed.

It will be recognized that network manager 102''' may not include one or more of venue designation module 902, comparison module 904, recommendation determination module 906, purpose recommendation module 908, user recommendation module 910, action determination module 912, and/or action module 914. Furthermore, network manager 102''' may include modules in addition to or in lieu of venue designation module 902, comparison module 904, recommendation determination module 906, purpose recommendation module 908, user recommendation module 910, action determination module 912, and/or action module 914.

FIGS. 10A-10B depict respective portions of a flowchart 1000 of still another method for taking action upon users in a social networking system with respect to a purpose based on compatibility of the users to the purpose in accordance with an embodiment described herein. Flowchart 1000 may be performed by network manager 102 of computer system 100 shown in FIG. 1, for example. For illustrative purposes, flowchart 1000 is described with respect to a network manager 102'''' shown in FIG. 11, which is an example of a network manager 102, according to an embodiment.

Figure 11:
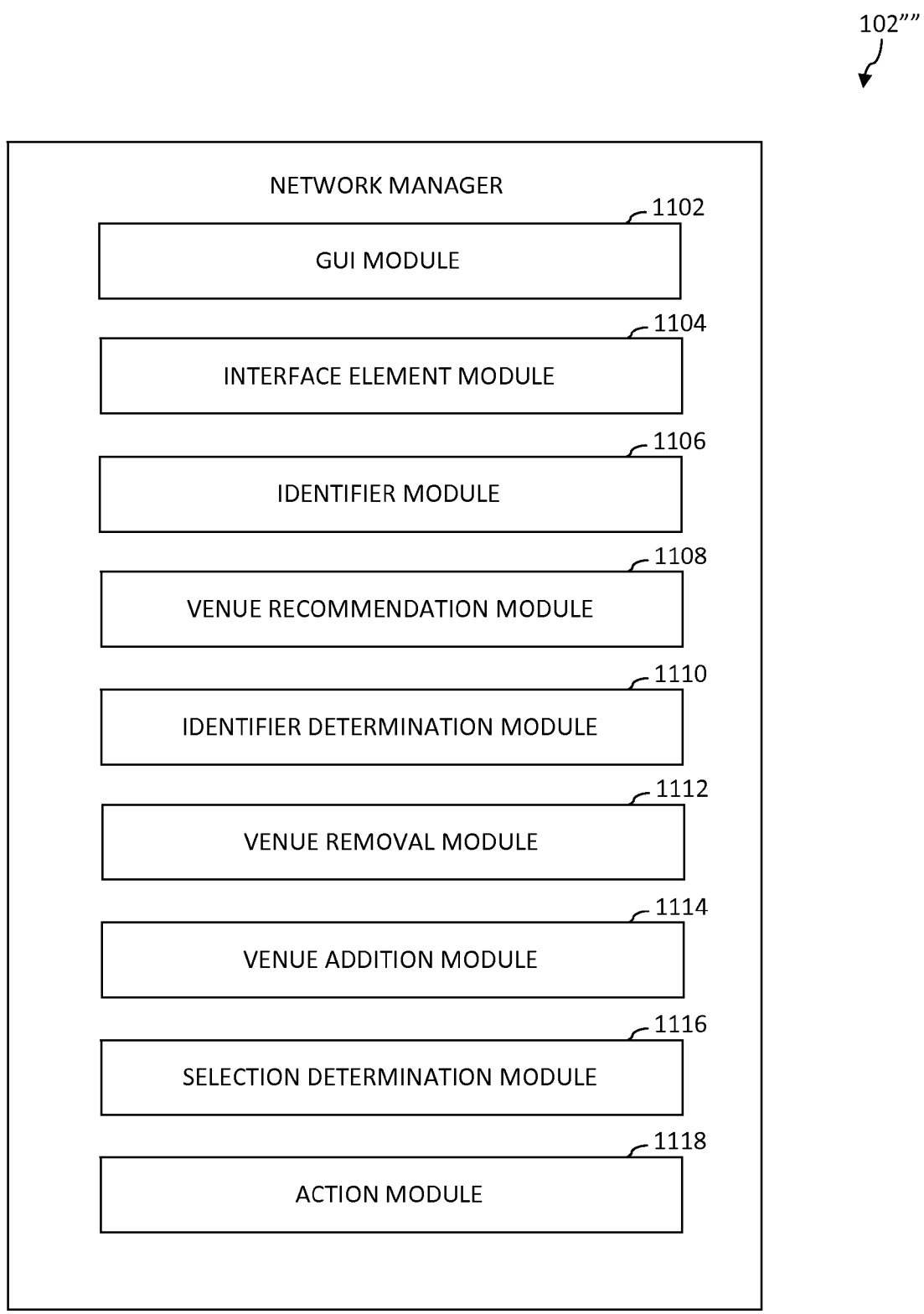

As shown in FIG. 11, network manager 102'''' includes a graphical user interface (GUI) module 1102, an interface element module 1104, an identifier module 1106, a venue recommendation module 1108, an identifier determination module 1110, a venue removal module 1112, a venue addition module 1114, a selection determination module 1116, and an action module 1118. Further structural and operational embodiments will be apparent to persons skilled in the relevant art(s) based on the discussion regarding flowchart 1000. Flowchart 1000 is described as follows.

As shown in FIG. 10A, the method of flowchart 1000 begins at step 1002. In step 1002, a graphical user interface (GUI) that includes a first interface element is provided. The first interface element represents a group that corresponds to a purpose that is associated with at least one first attribute. In an example implementation, GUI module 1102 provides the GUI that includes the first interface element. For instance, interface element module 1104 may provide the first interface element to GUI module 1102 for inclusion in the GUI that is provided by GUI module 1102.

At step 1004, a plurality of identifiers that represents a plurality of respective users is provided in the GUI. The plurality of respective users has a plurality of respective second attributes that are compatible with the at least one first attribute. The first interface element includes at least one identifier of the plurality of identifiers that represents at least one respective user of the plurality of users having at least one respective second attribute of the plurality of second attributes. In an example implementation, identifier module 1106 provides the plurality of identifiers that represents the plurality of respective users.

At step 1006, one or more venues associated with one or more respective third attributes that are compatible with the at least one first attribute and the at least one second attribute are recommended. In an example implementation, venue recommendation module 1108 recommends the one or more venues.

At step 1008, a determination is made whether an identifier is added to the first interface element that represents a user having an attribute that is incompatible with a first venue of the one or more venues. In an example implementation, identifier determination module 1110 determines whether an identifier is added to the first interface element that represents a user having an attribute that is incompatible with the first venue of the one or more venues. If an identifier is added to the first interface element that represents a user having an attribute that is incompatible with the first venue, flow continues to step 1010. Otherwise, flow continues to step 1012, which is shown in FIG. 10B.

At step 1010, the first venue is removed from the one or more venues. In an example implementation, venue removal module 1112 removes the first venue from the one or more venues.

At step 1012, a determination is made whether an identifier is removed from the first interface element that represents a user having an attribute that is incompatible with a second venue of the one or more venues. The second venue may be the same or different from the first venue. In an example implementation, identifier determination module 1110 determines whether an identifier is removed from the first interface element that represents a user having an attribute that is incompatible with the second venue of the one or more venues. If an identifier is removed from the first interface element that represents a user having an attribute that is incompatible with the second venue, flow continues to step 1014. Otherwise, flow continues to step 1016.

At step 1014, the second venue is added to the one or more venues. In an example implementation, venue addition module 1114 adds the second venue to the one or more venues.

At step 1016, a determination is made whether a third venue of the one or more venues is selected. The third venue may be the same or different from the first venue. The third venue may be the same or different from the second venue. In an example implementation, selection determination module 1116 determines whether the third venue of the one or more venues is selected. If the third venue of the one or more venues is selected, flow continues to step 1018. Otherwise, flowchart 1000 ends.

At step 1018, the at least one user of the plurality of users that is represented by the at least one respective identifier of the plurality of identifiers that is included in the first interface element is invited to meet at the third venue. In an example implementation, action module 1118 invites the at least one user of the plurality of users to meet at the third venue.

In some example embodiments, one or more steps 1002, 1004, 1006, 1008, 1010, 1012, 1014, 1016, and/or 1018 of flowchart 1000 may not be performed. Moreover, steps in addition to or in lieu of steps 1002, 1004, 1006, 1008, 1010, 1012, 1014, 1016, and/or 1018 may be performed.

It will be recognized that network manager 102"" may not include one or more of GUI module 1102, interface element module 1104, identifier module 1106, venue recommendation module 1108, identifier determination module 1110, venue removal module 1112, venue addition module 1114, selection determination module 1116, and/or action module 1118. Furthermore, network manager 102"" may include modules in addition to or in lieu of GUI module 1102, interface element module 1104, identifier module 1106, venue recommendation module 1108, identifier determination module 1110, venue removal module 1112, venue addition module 1114, selection determination module 1116, and/or action module 1118.

Figure 12:
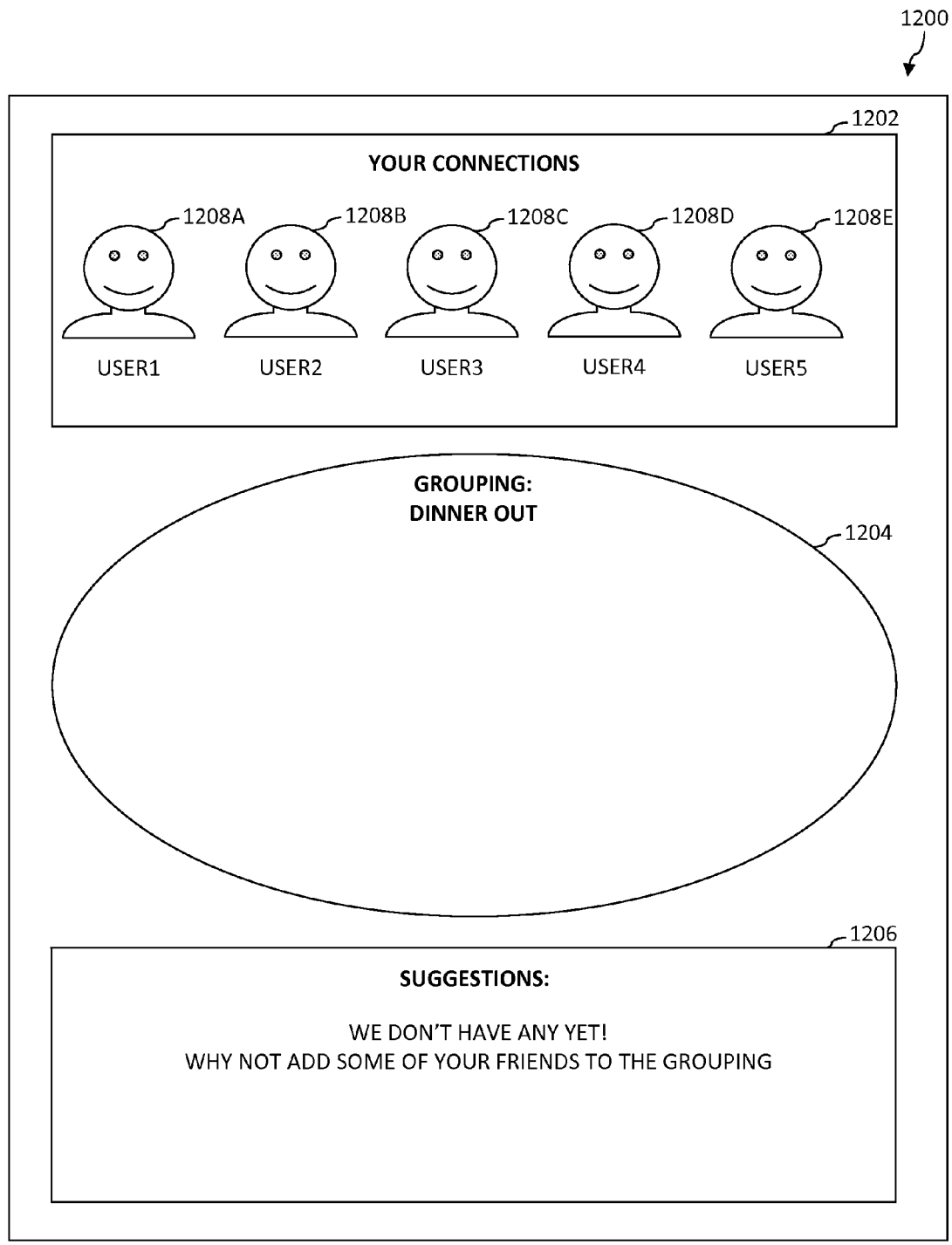
Figure 13:
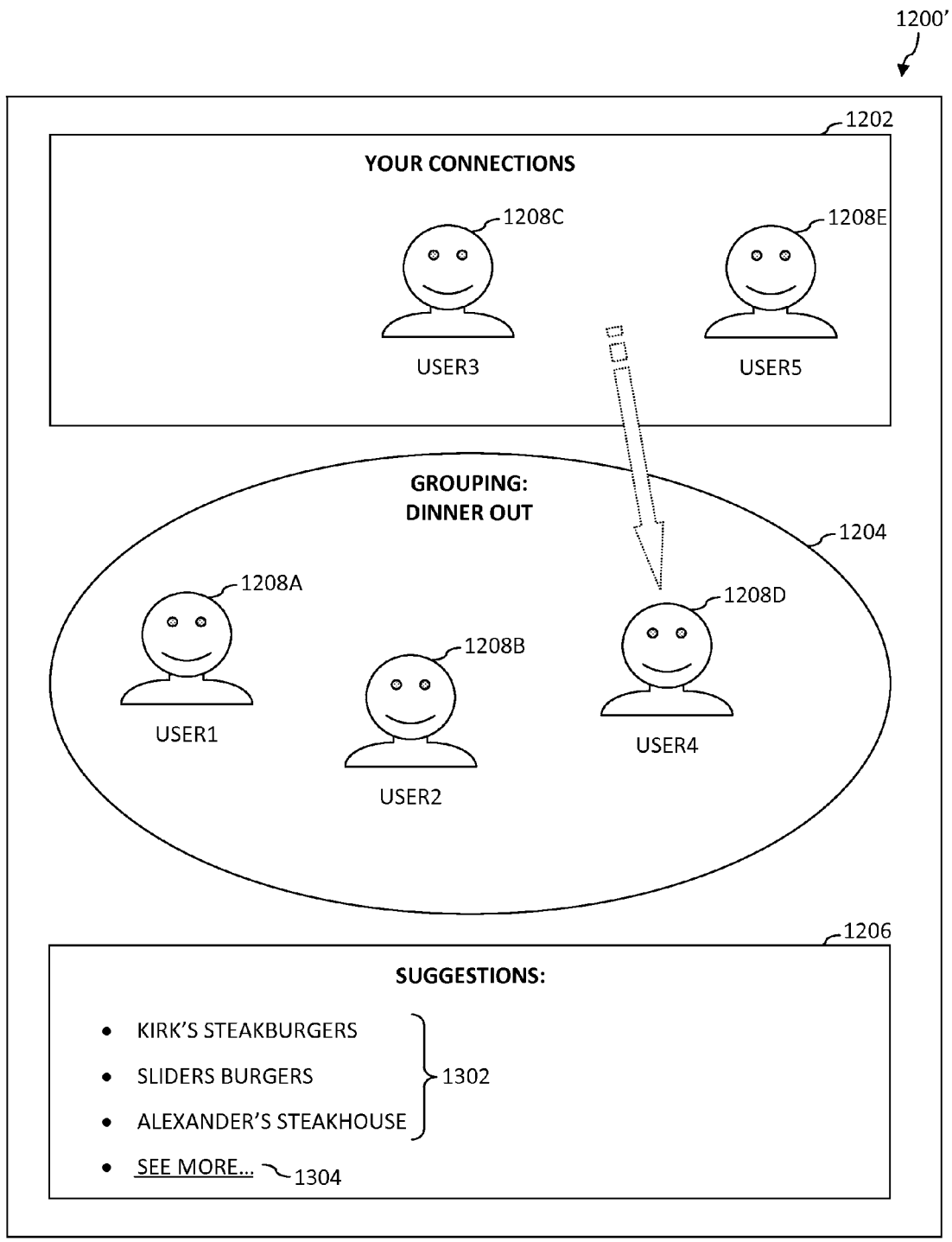
Figure 14:
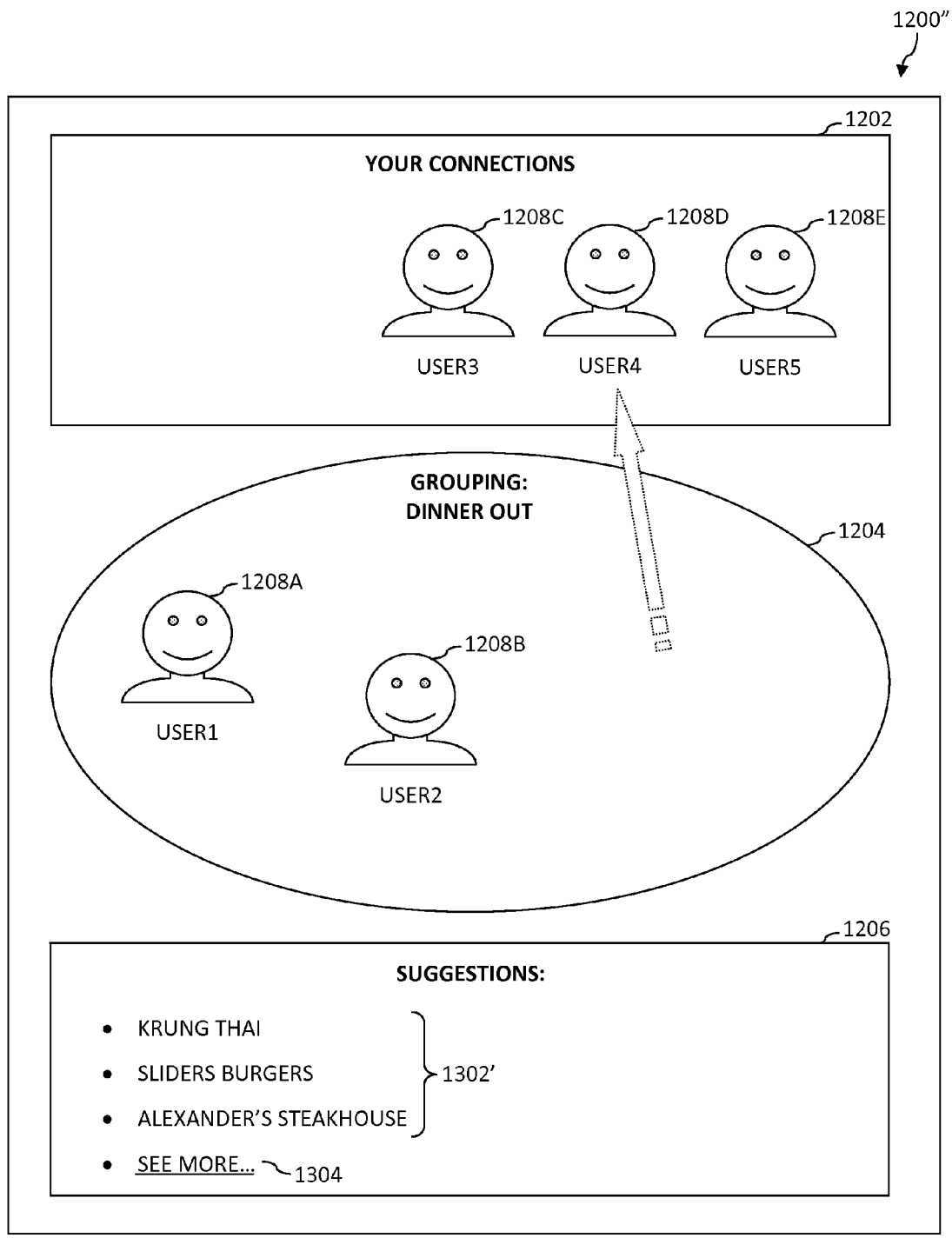

FIGS. 12, 13, and 14 are illustrations of example graphical user interfaces (GUIs) 1200, 1300, and 1400 in accordance with embodiments described herein. GUIs 1200, 1300, and 1400 may be represented as respective Web pages, though the scope of the example embodiments is not limited in this respect. GUIs 1200, 1300, and 1400 will be described with respect to a hypothetical scenario in which a user (referred to herein as the "planning user") is planning an event for other users who are connections of the planning user.

As shown in FIG. 12, GUI 1200 includes a connections window 1202, a grouping interface element 1204, and a suggestions window 1206. Connections window 1202 includes a plurality of identifiers 1208A-1208E that represent respective connections of the planning user. Identifiers 1208A-1208E are shown to represent User1, User2, User3, User4, and User5, respectively, each of which is a respective connection of the planning user.

In the hypothetical scenario mentioned above, the planning user designates a purpose for the event in grouping interface element 1204. In particular, the planning user designates that the purpose of the event is "Dinner Out". This purpose may be associated with any of a variety of attributes, including but not limited to food, dinner, dining, meal, restaurant, etc.

Suggestions window 1206 includes a textual message, stating "We don't have any yet! Why not add some of your friends to the grouping." The textual message in suggestions window 1206 is provided for illustrative purposes and is not intended to be limiting. It will be recognized that suggestions window 1206 may include any suitable textual message or no textual message. For example, suggestion window 1206 may include a plurality of venues having attributes that are compatible with attributes associated with the purpose of "Dinner Out:" and the attributes associated with the planning user. For instance, suggestion window 1206 may include a list of restaurants that the planning user likes. In accordance with this example, the number of venues that are included in suggestion window 1206 may decrease as identifier(s) are added to the "Dinner Out" grouping, as described below with reference to FIG. 13.

It will be recognized that the designated purpose may include a date, a time, or any of a variety of other factors. These factors may be taken into account during a compatibility analysis that is performed once identifier(s) are added to the "Dinner Out" grouping.

Referring now to FIG. 13, GUI 1200' is a representation of GUI 1200 having a changed configuration. As shown in FIG. 13, the planning user drags identifiers 1208A, 1208B, and 1208D from connections window 1202 and positions identifiers 1208A, 1208B, and 1208D to overlap with grouping interface element 1204 (e.g., within the oval that represents grouping interface element 1204). Grouping interface element 1204 is shown to be an oval for illustrative purposes and is not intended to be limiting. Grouping interface element 1204 may be any suitable shape.

Assume for purposes of illustration that User1 has attributes of steak, burger, and fries; User2 has attributes of beef, chicken, and fish; and User4 has attributes of burgers and no peanuts. When identifiers 1208A, 1208B, and 1208D are dragged to overlap grouping interface element 1204, a compatibility analysis is performed to determine venues having attributes that are compatible with the attributes associated with the purpose of "Dinner Out" and the attributes of User1, User2, and User4.

Suggestions window 1206 includes textual indicators 1302 that represent respective recommended venues resulting from the compatibility analysis. The venues of Kirk's Steakburgers, Sliders Burgers, and Alexander's Steakhouse are shown in suggestions window 1206 for illustrative purposes. It should be noted that textual indicators 1302 do not include venues having an attribute of "peanuts", for example, because User4 is associated with a negative attribute of "no peanuts". User4's attribute of "no peanuts" may be represented as a negative tag or a tag that includes a negative polarity, for example. The planning user may select (e.g., click on) link 1304 to see more venues that resulted from the compatibility analysis.

Identifiers 1208A, 1208B, and 1208D are shown to be dragged by the planning user for illustrative purposes. It will be recognized that identifiers (e.g., identifiers 1208A, 1208B, and 1208D) may be removed from connections window 1202 and overlapped upon grouping interface element 1204 using any suitable technique. For example, the planning user may cut the identifiers from connections window 1202 and paste the identifiers such that the identifiers overlap with grouping interface element 1204. In another example, selection of the identifiers in connections window 1202 may cause the identifiers to be removed from connections window 1202 and to be overlapped upon grouping interface element 1204. In accordance with this example, selecting identifiers that overlap with grouping interface element 1204 may cause the identifiers to be placed in connections window 1202.

Referring now to FIG. 14, GUI 1200" is a representation of GUI 1200 having another changed configuration. As shown in FIG. 14, the planning user drags identifier 1208D so that identifier 1208D no longer overlaps with grouping interface element 1204 and positions identifier 1208D in connections window 1202. Positioning identifier 1208D so that it no longer overlaps with grouping interface element 1204 changes the configuration of GUI 1200' shown in FIG. 13. Changing the configuration of GUI 1200' causes a compatibility analysis to be performed to determine venues having attributes that are compatible with the attributes associated with the purpose of "Dinner Out" and the attributes of User1 and User2, which still overlap with grouping interface element 1204. For instance, the compatibility analysis may be automatically performed in response to the configuration of GUI 1200' changing.

As shown in textual window 1206 of FIG. 14, textual indicators 1302' include a venue of "Krung Thai" in lieu of "Kirk's Steakburgers". Krung Thai has an attribute of "peanuts", which is incompatible with User4's attribute of "no peanuts". Recall that Krung Thai was not included in textual indicators 1302 of GUI 1200' in FIG. 13 due to the aforementioned incompatibility. However, Krung Thai is included in textual indicators 1302' of GUI 1200" in FIG. 14 because the aforementioned incompatibility is no longer taken into account during the compatibility analysis. For instance, identifier 1208D no longer overlaps grouping interface element 1204. Thus, attributes associated with User4 are no longer taken into account. It will be recognized that the inclusion of Krung Thai in textual indicators 1302' is based on Krung Thai not being associated with any attributes that are incompatible with an attribute of the purpose of "Dinner Out" or any attribute of User1 or User2.

An invitation button (not shown) may be included in any of GUIs 1200, 1200', and/or 1200", though the scope of the example embodiments is not limited in this respect. The invitation button may enable the planning user to send an invitation to the users whose respective identifiers overlap grouping interface element 1204. For instance, the planning user may select (e.g., highlight, click on, etc.) an identifier (e.g., any of identifiers 1302' in FIG. 14) that is included in window 1206. The planning user may then select (e.g., click on) the invitation button to initiate the transfer of an invitation to each of the users whose respective identifiers overlap grouping interface element 1204. The invitation may specify the purpose of the invitation (e.g., "Dinner Out", the venue that is selected by the planning user in window 1206, a listing of other venues that resulted from the compatibility analysis, the users to whom the invitation is being sent, etc.

Upon receiving the invitation, a user may propose changes to the group of users that is invited to the event, the purpose, and/or the venue. The user may suggest the addition of one or more users to the group and/or the deletion of one or more users from the group, inform the planning user (and potentially the other users in the group) that one or more users in the group are unable to attend, etc. According to an example embodiment, a user in the group may respond on behalf of a plurality of users who are in the group, assuming that a social connection exists between those users. For instance, either spouse may respond on behalf of the couple or the family, but not on behalf of an unconnected user in the group.

Upon receiving any proposed changes, the planning user may implement one or more of the proposed changes, delegate organization of the group to a user in the group or to a third party (i.e., a person who is not a member of the group), or take no action with respect to the proposed changes.

FIGS. 15A-15B depict respective portions of a flowchart 1500 of yet still another method for taking action upon users in a social networking system with respect to a purpose based on compatibility of the users to the purpose in accordance with an embodiment described herein. Flowchart 1500 may be performed by network manager 102 of computer system 100 shown in FIG. 1, for example. For illustrative purposes, flowchart 1500 is described with respect to a network manager 102'''' shown in FIG. 16, which is an example of a network manager 102, according to an embodiment.

Figure 16:
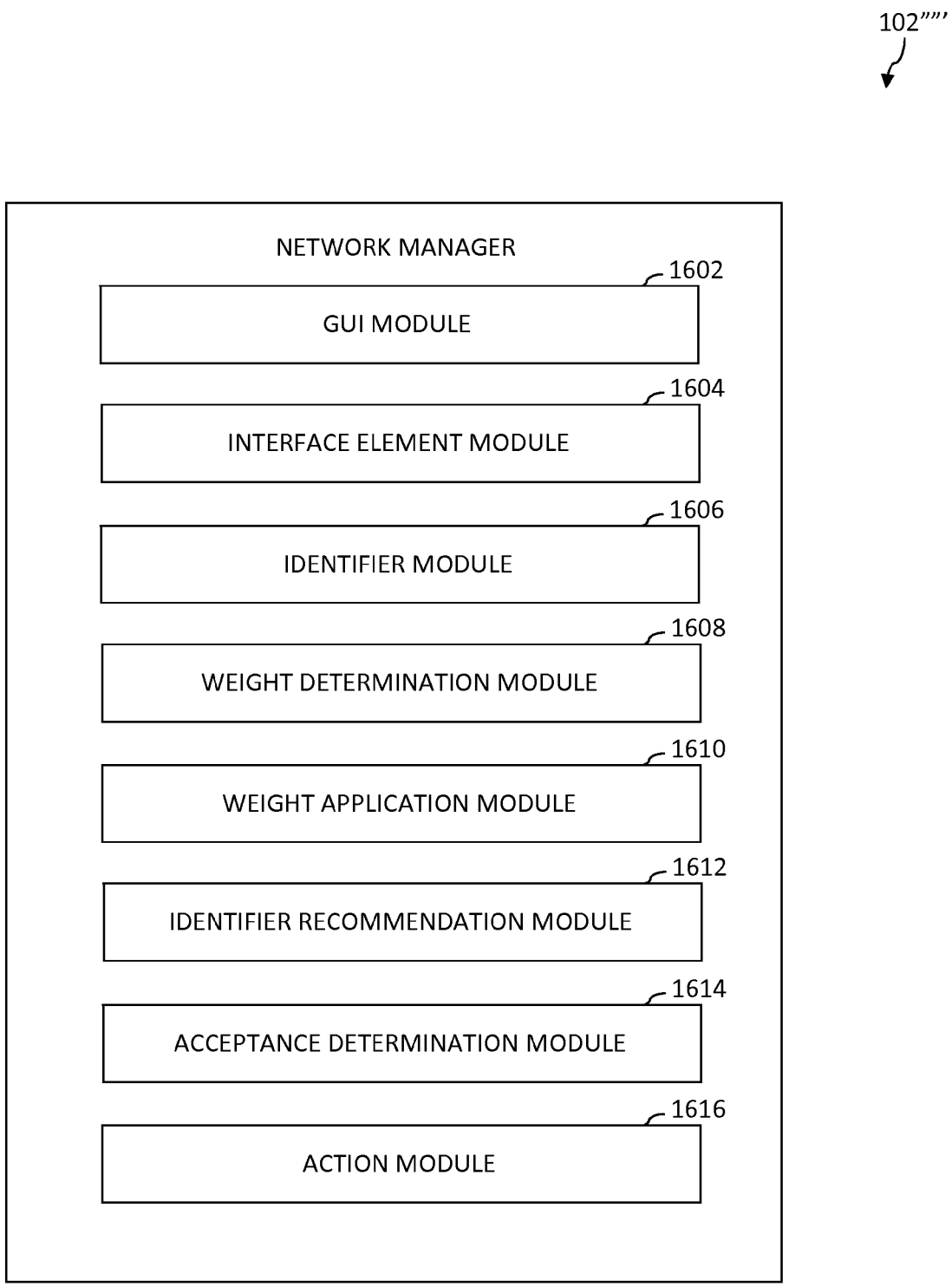

As shown in FIG. 16, network manager 102'''' includes a graphical user interface (GUI) module 1602, an interface element module 1604, an identifier module 1606, a weight determination module 1608, a weight application module 1610, an identifier recommendation module 1612, an acceptance determination module 1614, and an action module 1616. Further structural and operational embodiments will be apparent to persons skilled in the relevant art(s) based on the discussion regarding flowchart 1500. Flowchart 1500 is described as follows.

As shown in FIG. 15A, the method of flowchart 1500 begins at step 1502. In step 1502, a graphical user interface (GUI) that includes a first interface element is provided. The first interface element represents a group that corresponds to a purpose that is associated with at least one first attribute. In an example implementation, GUI module 1602 provides the GUI that includes the first interface element. For instance, interface element module 1604 may provide the first interface element to GUI module 1602 for inclusion in the GUI that is provided by GUI module 1602.

At step 1504, a plurality of identifiers that represents a plurality of respective users is provided in the GUI. The plurality of users has a plurality of respective second attributes. In an example implementation, identifier module 1606 may provide the plurality of identifiers that represents the plurality of respective users.

At step 1506, a determination is made whether a plurality of weights is to be applied to the plurality of respective second attributes. In an example implementation, weight determination module 1608 determines whether the plurality of weights is to be applied to the plurality of respective second attributes. If the plurality of weights is to be applied to the plurality of respective second attributes, flow continues to step 1508. Otherwise, flow continues to step 1512.

At step 1508, the plurality of weights is applied to the plurality of respective second attributes. In an example implementation, weight application module 1610 applies the plurality of weights to the plurality of respective second attributes.

At step 1510, one or more identifiers of the plurality of identifiers is recommended for inclusion in the first interface element based on one or more respective weights of the plurality of weights that are applied to one or more respective second attributes. The one or more identifiers represent one or more respective users of the plurality of users that have the one or more respective second attributes of the plurality of second attributes that are compatible with the at least one first attribute. In an example implementation, identifier recommendation module 1612 recommends the one or more identifiers of the plurality of identifiers for inclusion in the first interface element.

At step 1512, one or more identifiers of the plurality of identifiers are recommended for inclusion in the first interface element. The one or more identifiers represent one or more respective users of the plurality of users that have the one or more respective second attributes of the plurality of second attributes that are compatible with the at least one first attribute. In an example implementation, identifier recommendation module 1612 recommends the one or more identifiers of the plurality of identifiers for inclusion in the first interface element.

Upon completion of step 1510 or 1512, flow continues to step 1514, which is shown in FIG. 15B. At step 1514, a determination is made whether one or more identifiers are accepted for inclusion in the first interface element. In an example implementation, acceptance determination module 1614 determines whether one or more identifiers are accepted for inclusion in the first interface element. If one or more identifiers are accepted for inclusion in the first interface element, flow continues to step 1516. Otherwise, flowchart 1500 ends.

At step 1516, one or more users that are represented by the one or more respective identifiers are invited to join the group that corresponds to the purpose that is associated with the at least one first attribute. In an example implementation, action module 1616 invites the one or more users that are represented by the one or more respective identifiers to join the group.

In some example embodiments, one or more steps 1502, 1504, 1506, 1508, 1510, 1512, 1514, and/or 1516 of flowchart 1500 may not be performed. Moreover, steps in addition to or in lieu of steps 1502, 1504, 1506, 1508, 1510, 1512, 1514, and/or 1516 may be performed.

It will be recognized that network manager 102'''' may not include one or more of GUI module 1602, interface element module 1604, identifier module 1606, weight determination module 1608, weight application module 1610, identifier recommendation module 1612, acceptance determination module 1614, and/or action module 1616. Furthermore, network manager 102'''' may include modules in addition to or in lieu of GUI module 1602, interface element module 1604, identifier module 1606, weight determination module 1608, weight application module 1610, identifier recommendation module 1612, acceptance determination module 1614, and/or action module 1616.

Figure 17:
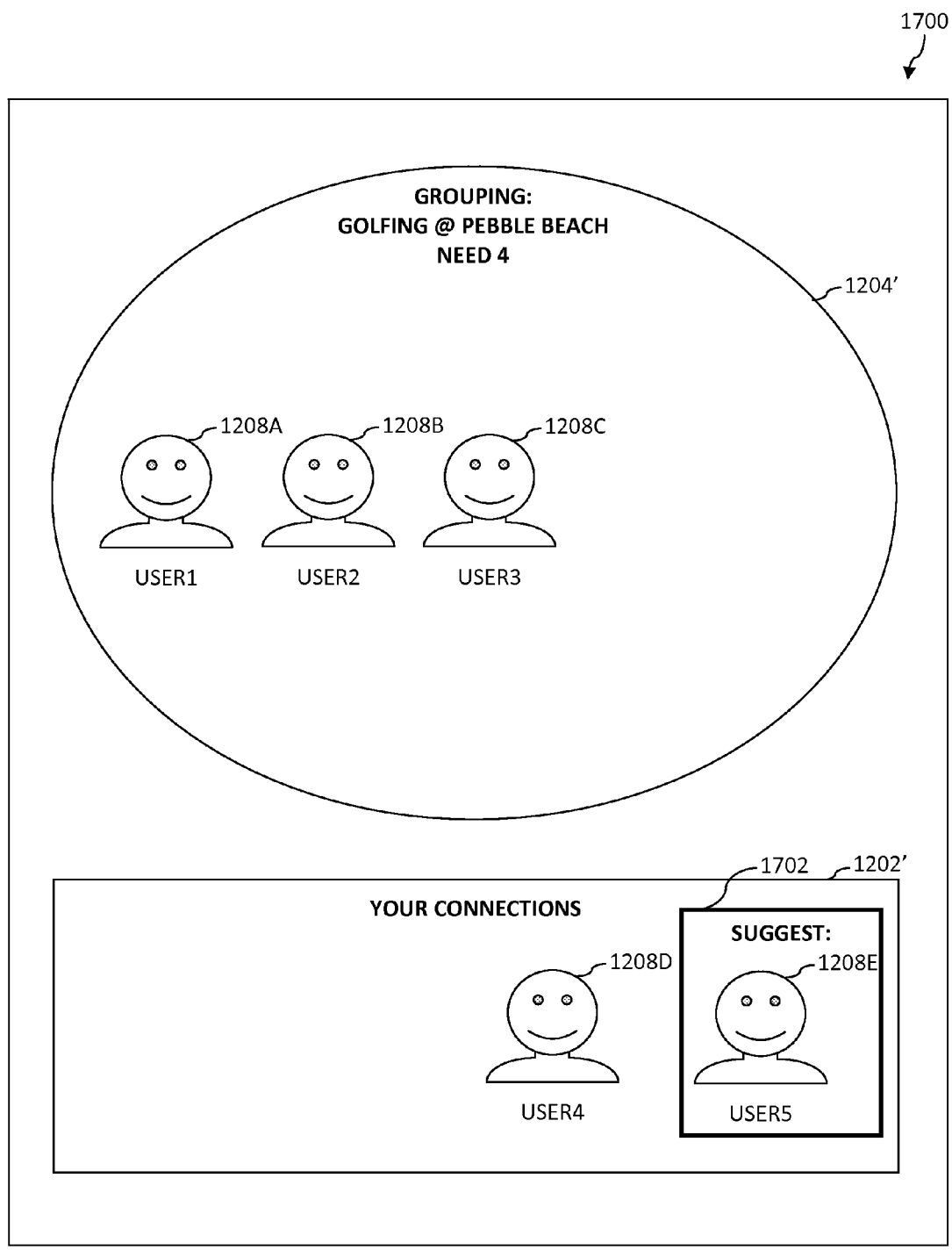

FIG. 17 is an illustration of an example graphical user interface (GUI) 1700 in accordance with an embodiment described herein. GUI 1700 may be represented as a Web page, though the scope of the example embodiments is not limited in this respect. GUI 1700 will be described with respect to a hypothetical scenario in which a planning user is planning a round of golf with connections of the planning user.

As shown in FIG. 17, GUI 1700 includes a connections window 1202' and a grouping interface element 1204'. Connections window 1202' includes identifiers 1208D and 1208E that represent User4 and User5, respectively, each of which is a connection of the planning user. As depicted in FIG. 17, the planning user has moved three identifiers (i.e., identifiers 1208A, 1208B, and 1208C), which represent other connections of the planning user, from connections window 1202' to grouping interface element 1204'.

The purpose associated with grouping interface element 1204' is "Golfing @ Pebble Beach, Need 4". Thus, achieving the purpose necessitates that four users are selected for the round of golf at Pebble Beach. Accordingly, four identifiers are to be included in grouping interface element 1204'. Because only three identifiers (i.e., identifiers 1208A, 1208B, and 1208C) have been included in interface element 1204' by the planning user, a fourth identifier (i.e., identifier 1208E) is recommended for inclusion in grouping interface element 1204'.

For instance, a compatibility analysis may be performed with respect to attributes of User1 through User5 and attributes of the purpose of "Golfing @ Pebble Beach, Need 4" to determine which of User4 and User5 is to be recommended for inclusion in grouping interface element 1204'. After completion of the compatibility analysis, a suggestion box 1702 is placed around identifier 1208E to indicate that identifier 1208E is recommended for inclusion in grouping interface element 1204'.

It will be recognized that any number of identifier(s) may be recommended for inclusion in a group interface element, depending on the purpose that is associated with the group interface element and the number of identifiers that are already included in the group interface element.

Although a purpose is designated in GUIs 1200, 1200', 1200'', and 1700 of respective FIGS. 12, 13, 14, and 17 prior to performance of a compatibility analysis, it will be recognized that a purpose need not necessarily be designated. For example, one or more purposes may be recommended as a result of a compatibility analysis. In accordance with this example, a compatibility analysis may be performed with respect to a plurality of attributes of a plurality of respective users and attribute(s) associated with respective purpose(s) to determine a purpose having attribute(s) that are compatible with the attributes of the users. For instance, the compatibility analysis may be used to determine how the users may be grouped in a productive way. In accordance with this example, user(s) may be added to or removed from the plurality of users, causing the compatibility analysis to be performed again based on the revised plurality of users. Such a technique may enable a planning user to create a group of likeminded users.

Example embodiments are not restricted to creation of a single group of users. For instance, a relatively large metagroup may be created, which includes relatively smaller subgroups. For example, a wedding or a banquet may have a plurality of attendees, which may be referred to as a metagroup. A seating plan may be developed using techniques described herein, such that sub-groups of the plurality of users are seated at respective tables based on compatibility of those users. For instance, the identifier suggestion techniques described with reference to FIG. 17 may be used to develop the seating plan.

In an example embodiment, GUI 1700 includes a plurality of grouping interface elements representing respective tables. A plurality of identifiers representing the plurality of respective attendees initially is included in connections window 1202' of FIG. 17. For example, the planning user may move one or more of the identifiers from connections window 1202' to the plurality of grouping interface elements. In accordance with this example, the remainder of the identifiers may be recommended for inclusion among the plurality of grouping interface elements based on attributes associated with the users who are included in the plurality of grouping interface elements. For instance, the compatibility analysis may assign seating to the plurality of attendees to optimize the compatibility of users at each table. In another example, the entire seating arrangement of the attendees may be determined using the identifier suggestion techniques described with reference to FIG. 17 without the planning user needing to designate seating for any of the attendees.

According to some example embodiments, a user has a plurality of personas (a.k.a. filters or views), which are associated with respective sets of attributes of the user. For instance, a first persona of the user may be associated with a first set of attributes; a second persona may be associated with a second set of attributes; and so on. One set of attributes need not necessarily be compatible with another set of attributes. For instance, a first set of attributes may include one or more attributes that are incompatible with one or more attributes that are included in a second set of attributes. Thus, rather than providing a holistic set of attributes for the user, the user may wish to provide only attributes that are associated with a persona of the user. The user may use different personas for different purposes, venues, events, etc. The user may choose to reveal only attributes that are associated with a persona that is to be used for a designated purpose, venue, event, etc., while keeping attributes that are unique to the other personas private.

A user may maintain privacy with respect to any one or more attributes (e.g., medial information), regardless whether the attributes are associated with persona(s). An attribute that is kept private from other users (which may include the planning user) may nevertheless be considered in a compatibility analysis. For example, a user who has a peanut allergy may set a flag associated with an attribute that indicates the peanut allergy to "private", so that the attribute that indicates the peanut allergy is not included in the user's profile, for example. However, the attribute that indicates the peanut allergy may nevertheless be taken into consideration during a compatibility analysis regarding the user. Thus, if an identifier that represents the user were dragged into a grouping interface element that represents a purpose of "Dinner Out", for example, a restaurant having peanut-laden dishes would not be included in a list of recommended venues regarding that purpose, but the reason that the restaurant is not included in the list would not be revealed to any of the other users.

Attributes may be generated based on a designated format, though the scope of the example embodiments is not limited in this respect. For instance, an attribute that indicates a peanut allergy, which the user wishes to keep private, may be represented as "nopeanut-private", for example. An attribute that indicates a married couple may be represented as "UserA-spouse-UserB", for example. These example formats are provided for illustrative purposes and are not intended to be limiting. Attributes may have any suitable designated format or no designated format.

Example embodiments are capable of searching beyond a user's connections to determine users who are compatible with a purpose and/or a venue. For instance, some example embodiments may perform a compatibility analysis with respect to the user's connections, connections of the user's connections, and so on. The user's connections may be referred to as a first level of connections; connections of the user's connections may be referred to as a second level of connections; and so on. A compatibility analysis may be performed based on any level of connections or combination of levels of connections. For example, a compatibility analysis may be performed with respect to a first level of connections and a second level of connections. In another example, a compatibility analysis may be performed with respect to first, second, and third levels of connections.

III. Example Computer Implementation

The embodiments described herein, including systems, methods/processes, and/or apparatuses, may be implemented using well known computers, such as computer 1800 shown in FIG. 18. For example, elements of example social networking system 100, including network manager 102 depicted in FIGS. 1, 5, 7, 9, 11, and 16 and elements thereof, user systems 108A-108N depicted in FIG. 1 and elements thereof, and each of the steps of flowcharts 400, 600, 800, 1000, and 1500 depicted in respective FIGS. 4, 6A-6B, 8, 10A-10B, and 15A-15B, can each be implemented using one or more computers 1800.

Computer 1800 can be any commercially available and well known computer capable of performing the functions described herein, such as computers available from International Business Machines, Apple, Sun, HP, Dell, Cray, etc. Computer 1800 may be any type of computer, including a desktop computer, a server, etc.

As shown in FIG. 18, computer 1800 includes one or more processors (e.g., central processing units (CPUs)), such as processor 1806. Processor 1806 may include any of clients 110A-110N of FIG. 1, comparison module 502 of FIG. 5, sort determination module 504 of FIG. 5, filter determination module 506 of FIG. 5, weight module 508 of FIG. 5, sort module 510 of FIG. 5, filter module 512 of FIG. 5, action module 514 of FIG. 5, comparison module 702 of FIG. 7, recommendation determination module 704 of FIG. 7, venue determination module 706 of FIG. 7, venue recommendation module 708 of FIG. 7, purpose recommendation module 710 of FIG. 7, user recommendation module 712 of FIG. 7, invitation determination module 714 of FIG. 7, group invitation module 716 of FIG. 7, event invitation module 718 of FIG. 7, action invitation module 720 of FIG. 7, action determination module 722 of FIG. 7, action module 724 of FIG. 7, venue designation module 902 of FIG. 9, comparison module 904 of FIG. 9, recommendation determination module 906 of FIG. 9, purpose recommendation module 908 of FIG. 9, user recommendation module 910 of FIG. 9, action determination module 912 of FIG. 9, action module 914 of FIG. 9, GUI module 1102 of FIG. 1, interface element module 1104 of FIG. 1, identifier module 1106 of FIG. 11, venue recommendation module 1108 of FIG. 1, identifier determination module 1110 of FIG. 11, venue removal module 1112 of FIG. 11, venue addition module 1114 of FIG. 11, selection determination module 1116 of FIG. 11, action module 1118 of FIG. 11, GUI module 1602 of FIG. 16, interface element module 1604 of FIG. 16, identifier module 1606 of FIG. 16, weight determination module 1608 of FIG. 16, weight application module 1610 of FIG. 16, identifier recommendation module 1612 of FIG. 16, acceptance determination module 1614 of FIG. 16, or action module 1616 of FIG. 16, or any portion or combination thereof, for example, though the scope of the embodiments is not limited in this respect. Processor 1806 is connected to a communication infrastructure 1802, such as a communication bus. In some embodiments, processor 1806 can simultaneously operate multiple computing threads.

Computer 1800 also includes a primary or main memory 1808, such as a random access memory (RAM). Main memory has stored therein control logic 1824A (computer software), and data.

Computer 1800 also includes one or more secondary storage devices 1810. Secondary storage devices 1810 include, for example, a hard disk drive 1812 and/or a removable storage device or drive 1814, as well as other types of storage devices, such as memory cards and memory sticks. For instance, computer 1800 may include an industry standard interface, such as a universal serial bus (USB) interface for interfacing with devices such as a memory stick. Removable storage drive 1814 represents a floppy disk drive, a magnetic tape drive, a compact disk drive, an optical storage device, tape backup, etc.

Removable storage drive 1814 interacts with a removable storage unit 1816. Removable storage unit 1816 includes a computer useable or readable storage medium 1818 having stored therein computer software 1824B (control logic) and/or data. Removable storage unit 1816 represents a floppy disk, magnetic tape, compact disc (CD), digital versatile disc (DVD), Blue-ray disc, optical storage disk, memory stick, memory card, or any other computer data storage device. Removable storage drive 1814 reads from and/or writes to removable storage unit 1816 in a well known manner.

Computer 1800 also includes input/output/display devices 1804, such as monitors, keyboards, pointing devices, etc.

Computer 1800 further includes a communication or network interface 1820. Communication interface 1820 enables computer 1800 to communicate with remote devices. For example, communication interface 1820 allows computer 1800 to communicate over communication networks or mediums 1822 (representing a form of a computer useable or readable medium), such as local area networks (LANs), wide area networks (WANs), the Internet, etc. Network interface 1820 may interface with remote sites or networks via wired or wireless connections. Examples of communication interface 1822 include but are not limited to a modem, a network interface card (e.g., an Ethernet card), a communication port, a Personal Computer Memory Card International Association (PCMCIA) card, etc.

Control logic 1824C may be transmitted to and from computer 1800 via the communication medium 1822.

Any apparatus or manufacture comprising a computer useable or readable medium having control logic (software) stored therein is referred to herein as a computer program product or program storage device. This includes, but is not limited to, computer 1800, main memory 1808, secondary storage devices 1810, and removable storage unit 1816. Such computer program products, having control logic stored therein that, when executed by one or more data processing devices, cause such data processing devices to operate as described herein, represent embodiments of the invention.

For example, each of the elements of example network manager 102, including comparison module 502, sort determination module 504, filter determination module 506, weight module 508, sort module 510, filter module 512, and action module 514, each depicted in FIG. 5; comparison module 702, recommendation determination module 704, venue determination module 706, venue recommendation module 708, purpose recommendation module 710, user recommendation module 712, invitation determination module 714, group invitation module 716, event invitation module 718, action invitation module 720, action determination module 722, and action module 724, each depicted in FIG. 7; venue designation module 902, comparison module 904, recommendation determination module 906, purpose recommendation module 908, user recommendation module 910, action determination module 912, and action module 914, each depicted in FIG. 9; GUI module 1102, interface element module 1104, identifier module 1106, venue recommendation module 1108, identifier determination module 1110, venue removal module 1112, venue addition module 1114, selection determination module 1116, and action module 1118, each depicted in FIG. 11; GUI module 1602, interface element module 1604, identifier module 1606, weight determination module 1608, weight application module 1610, identifier recommendation module 1612, acceptance determination module 1614, and action module 1616, each depicted in FIG. 16; and each of the steps of flowcharts 400, 600, 800, 1000, and 1500 depicted in respective FIGS. 4, 6A-6B, 8, 10A-10B, and 15A-15B can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
comparing, by a processor, a first plurality of attributes associated with a first plurality of respective users in a social networking system to at least one second attribute associated with a purpose;
determining, by the processor from the comparing, that an attribute in the first plurality of attributes is compatible with the at least one second attribute from a comparison of metadata associated with each respective attribute, the metadata associated with the each respective attribute comprising a polarity indicator indicating whether the each respective attribute is compatible with the corresponding user or the purpose, the comparison of metadata comprising determining whether each respective attribute is compatible with the corresponding user or the purpose by determining that the polarity indicators associated with the attributes do not represent opposite polarities with respect to the corresponding user or the purpose; and
based on the determining, taking action, by the processor, upon a second plurality of users that is included in the first plurality of users with respect to the purpose, the second plurality of users having respective attributes of the first plurality of attributes that are compatible with the at least one second attribute.

2. The method of claim 1, further comprising:
determining a venue having a third attribute that is compatible with the attributes of the second plurality of users and the at least one second attribute associated with the purpose in response to comparing the first plurality of attributes to the at least one second attribute;
wherein taking action upon the second plurality of users comprises:
recommending the venue at which the second plurality of users is to achieve the purpose.

3. The method of claim 1, further comprising:
designating a venue having a third attribute that is compatible with the attributes of the second plurality of users and the at least one second attribute associated with the purpose;
wherein comparing the first plurality of attributes to the at least one second attribute is performed in response to designating the venue; and
wherein taking action upon the second plurality of users comprises:
recommending the purpose to be achieved at the venue by the second plurality of users.

4. The method of claim 1, further comprising:
designating a venue having a third attribute that is compatible with the attributes of the second plurality of users and the at least one second attribute associated with the purpose;
wherein comparing the first plurality of attributes to the at least one second attribute is performed in response to designating the venue; and
wherein taking action upon the second plurality of users comprises:
recommending the second plurality of users for achieving the purpose at the venue.

5. The method of claim 1, wherein taking action upon the second plurality of users comprises:
recommending the purpose to be achieved by the second plurality of users.

6. The method of claim 1, wherein taking action upon the second plurality of users comprises:
recommending the second plurality of users for achieving the purpose.

7. The method of claim 1, wherein taking the action upon the second plurality of users comprises:
inviting the second plurality of users to join a group that is associated with the purpose.

8. The method of claim 1, wherein taking the action upon the second plurality of users comprises:
inviting the second plurality of users to attend an event that is associated with the purpose.

9. The method of claim 1, wherein taking the action upon the second plurality of users comprises:
inviting the second plurality of users to perform an action that is associated with the purpose.

10. A system comprising:
a processor;
a storage medium for tangibly storing thereon program logic for execution by the processor, the stored program logic comprising:
comparing logic executed by the processor for comparing a first plurality of attributes associated with a first plurality of respective users in a social networking system to at least one second attribute associated with a purpose,
compatibility determining logic executed by the processor for determining, from the comparing, that an attribute in the first plurality of attributes is compatible with the at least one second attribute from a comparison of metadata associated with each respective attribute, the metadata associated with the each respective attribute comprising a polarity indicator indicating whether the each respective attribute is compatible with the corresponding user or the purpose, the comparison of metadata comprising determining whether each respective attribute is compatible with the corresponding user or the purpose by determining that the polarity indicators associated with the attributes do not represent opposite polarities with respect to the corresponding user or the purpose; and
action logic executed by the processor for, based on the determining, take action upon a second plurality of users that is included in the first plurality of users with respect to the purpose, the second plurality of users having respective attributes that are compatible with the at least one second attribute.

11. The system of claim 10, further comprising:
filtering logic executed by the processor for filtering the first plurality of users with respect to the at least one second attribute to determine the second plurality of users.

12. The system of claim 10, further comprising:
weighing logic executed by the processor for applying a plurality of weights to the first plurality of respective attributes to provide a first plurality of respective weighted attributes; and
sorting logic executed by the processor for sorting the first plurality of users with respect to the at least one second attribute based on the first plurality of respective weighted attributes to determine the second plurality of users.

13. A method comprising:
providing, by a processor, a graphical user interface that includes a first interface element, the first interface element representing a group that corresponds to a purpose that is associated with at least one first attribute;
providing, by the processor, a plurality of identifiers that represent a plurality of respective users in the graphical user interface, the plurality of users having a plurality of respective second attributes that are determined to be compatible with the at least one first attribute based on a comparison of the plurality of respective second attributes with the at least one first attribute, the first interface element including at least one identifier of the plurality of identifiers that represents at least one respective user of the plurality of users having at least one respective second attribute of the plurality of second attributes;
determining, by the processor, one or more venues associated with one or more respective third attributes that are compatible with the at least one first attribute and the at least one second attribute, the determining based on a comparison of metadata associated with each respective attribute, the metadata associated with the each respective attribute comprising a polarity indicator indicating whether the each respective attribute is compatible, the comparison of metadata comprising determining whether each respective attribute is compatible by determining that the polarity indicators associated with the attributes do not represent opposite polarities; and
recommending, by the processor, the one or more venues.

14. The method of claim 13, further comprising:
removing a first venue from the one or more venues in response to addition of a first identifier to the first interface element, the first identifier representing a user having an attribute that is incompatible with the first venue.

15. The method of claim 13, further comprising:
adding a first venue to the one or more venues in response to removal of a first identifier from the first interface element, the first identifier representing a user having an attribute that is incompatible with the first venue.

16. The method of claim 13, further comprising:
determining that a first venue of the one or more venues is selected; and
inviting the at least one user of the plurality of users to meet at the first venue in response to determining that the first venue is selected.

17. A system comprising:
a processor;
a storage medium for tangibly storing thereon program logic for execution by the processor, the stored program logic comprising:
graphical user interface providing logic executed by the processor for providing a graphical user interface that includes a first interface element, the first interface element representing a group that corresponds to a purpose that is associated with at least one first attribute;
identifier providing logic executed by the processor for providing a plurality of identifiers that represents a plurality of respective users in the graphical user interface, the plurality of users having a plurality of respective second attributes that are determined to be compatible with the at least one first attribute based on a comparison of the plurality of respective second attributes with the at least one first attribute, the first interface element including at least one identifier of the plurality of identifiers that represents at least one respective user of the plurality of users having at least one respective second attribute of the plurality of second attributes;

determining logic executed by the processor for determining one or more venues associated with one or more respective third attributes that are compatible with the at least one first attribute and the at least one second attribute, the determining based on a comparison of metadata associated with each respective attribute, the metadata associated with the each respective attribute comprising a polarity indicator indicating whether each respective attribute is compatible, the comparison of metadata comprising determining whether the each respective attribute is compatible by determining that the polarity indicators associated with the attributes do not represent opposite polarities; and venue recommending logic executed by the processor for recommending the one or more venues.

18. The system of claim 17, further comprising:

venue removing logic executed by the processor for removing a first venue from the one or more venues in response to addition of a first identifier to the first interface element, the first identifier representing a user having an attribute that is incompatible with the first venue.

19. The system of claim 17, further comprising:

venue adding logic executed by the processor for adding a first venue to the one or more venues in response to removal of a first identifier from the first interface element, the first identifier representing a user having an attribute that is incompatible with the first venue.

20. The system of claim 17, further comprising:

selecting logic executed by the processor for selecting whether a first venue of the one or more venues is selected; and inviting logic executed by the processor for inviting the at least one user of the plurality of users to meet at the first venue in response to a determination that the first venue is selected.

* * * * *